US 11,724,421 B2

(12) United States Patent
Jones et al.

(10) Patent No.: US 11,724,421 B2
(45) Date of Patent: Aug. 15, 2023

(54) DEMOLDING OF LARGE COMPOSITE PARTS FOR AIRCRAFT

(71) Applicant: The Boeing Company, Chicago, IL (US)

(72) Inventors: Darrell D. Jones, Mill Creek, WA (US); Daniel R. Smith, Woodinville, WA (US); Patrick B. Stone, Monroe, WA (US); David Raines, Huntsville, AL (US); Byron James Autry, Charleston, SC (US); Matthew B. Moore, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/454,273

(22) Filed: Nov. 10, 2021

(65) Prior Publication Data

US 2022/0152880 A1    May 19, 2022

Related U.S. Application Data

(60) Provisional application No. 63/115,043, filed on Nov. 18, 2020.

(51) Int. Cl.
*B29C 33/44*    (2006.01)
*B29C 33/50*    (2006.01)
(Continued)

(52) U.S. Cl.
CPC ............ *B29C 33/50* (2013.01); *B29C 70/342* (2013.01); *B29C 70/54* (2013.01); *B64F 5/10* (2017.01);
(Continued)

(58) Field of Classification Search
CPC ... B29C 33/44; B29C 33/444; B29C 37/0007; B29C 37/0017
See application file for complete search history.

(56) References Cited

U.S. PATENT DOCUMENTS 2,383,225 A  *  8/1945  Sorensen .................. B64F 5/10
                                                  29/430
8,088,236 B2 *  1/2012  Schendel .............. B29C 70/386
                                                  156/577
(Continued)

FOREIGN PATENT DOCUMENTS

EP        3552773 A1    10/2019

OTHER PUBLICATIONS

Netherlands Patent Office Written Opinion and Search Report with English Translation, dated Jun. 15, 2021, regarding Application No. NL2027398, 10 pages.
(Continued)

*Primary Examiner* — Matthew J Daniels
(74) *Attorney, Agent, or Firm* — Yee & Associates, P.C.

(57) ABSTRACT

Systems and methods are provided for demolding a composite part from a mandrel. The method includes mechanically coupling a first arm of an extraction tool to a first arcuate portion of a composite part that has been hardened onto a mandrel, mechanically coupling a second arm of an extraction tool to a second arcuate portion of the composite part, and separating the composite part from the mandrel by iteratively performing the following operations until the composite part no longer contacts the mandrel: elastically straining the first arcuate portion of the composite part via the first arm, and elastically straining the second arcuate portion of the composite part via the second arm.

26 Claims, 21 Drawing Sheets

(51) Int. Cl.
    *B64F 5/50*    (2017.01)
    *B64F 5/10*    (2017.01)
    *B29C 70/54*   (2006.01)
    *B29C 70/34*   (2006.01)
    *B64C 1/12*        (2006.01)
    *B64C 1/00*        (2006.01)

(52) U.S. Cl.
    CPC ............... *B64F 5/50* (2017.01); *B64C 1/12* (2013.01); *B64C 2001/0072* (2013.01)

(56) References Cited

U.S. PATENT DOCUMENTS

| | | |
|---|---|---|
| 2004/0050498 A1 | 3/2004 | Herrmann et al. |
| 2006/0034968 A1* | 2/2006 | Wennberg ............... B29C 39/36 425/436 R |
| 2008/0196825 A1 | 8/2008 | Hamlyn |
| 2013/0000815 A1 | 1/2013 | Barlag et al. |
| 2013/0020030 A1 | 1/2013 | Lonsdorfer et al. |
| 2017/0210039 A1* | 7/2017 | Yestrau ............... B29C 37/0007 |

OTHER PUBLICATIONS

European Patent Office Extended Search Report, dated Mar. 23, 2022, regarding Application No. EP21207359.7, 5 pages.

\* cited by examiner

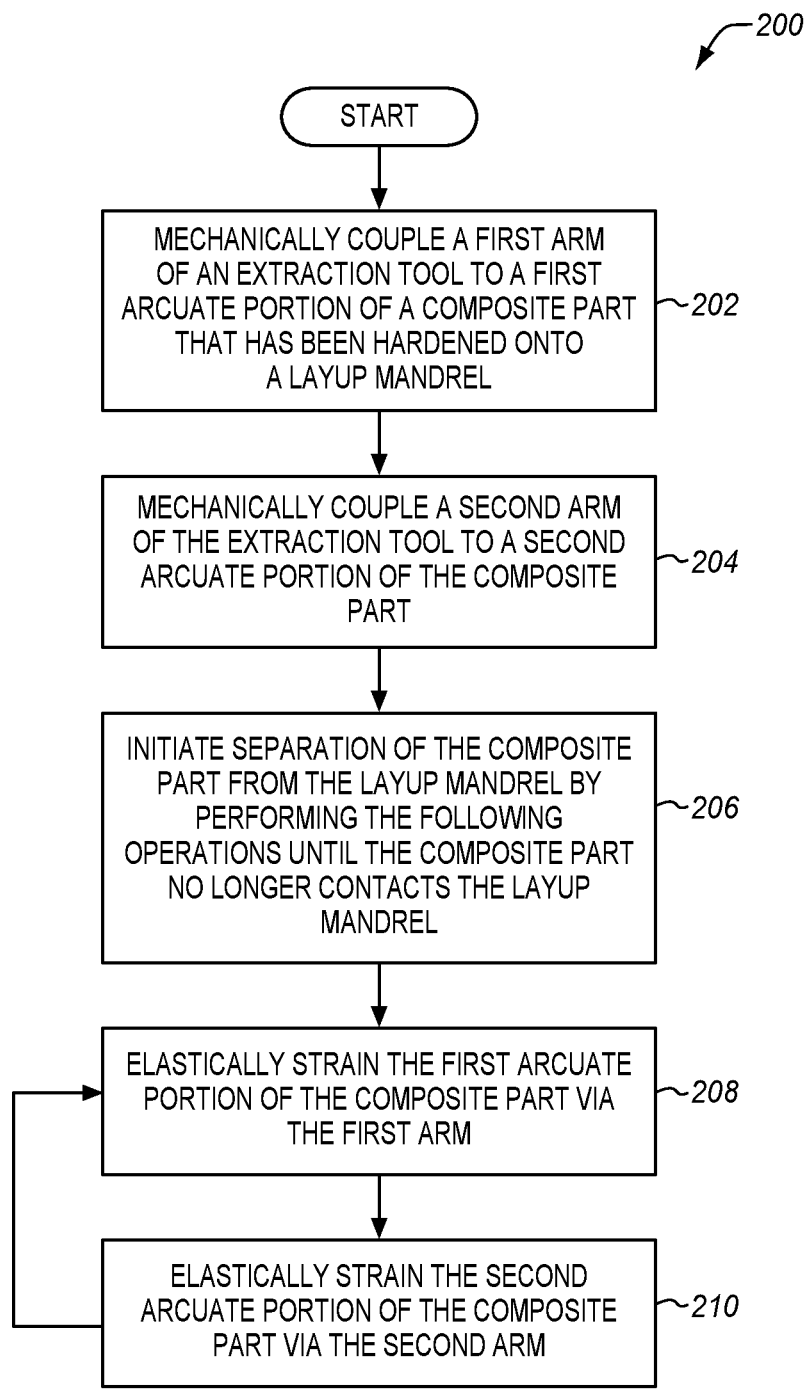

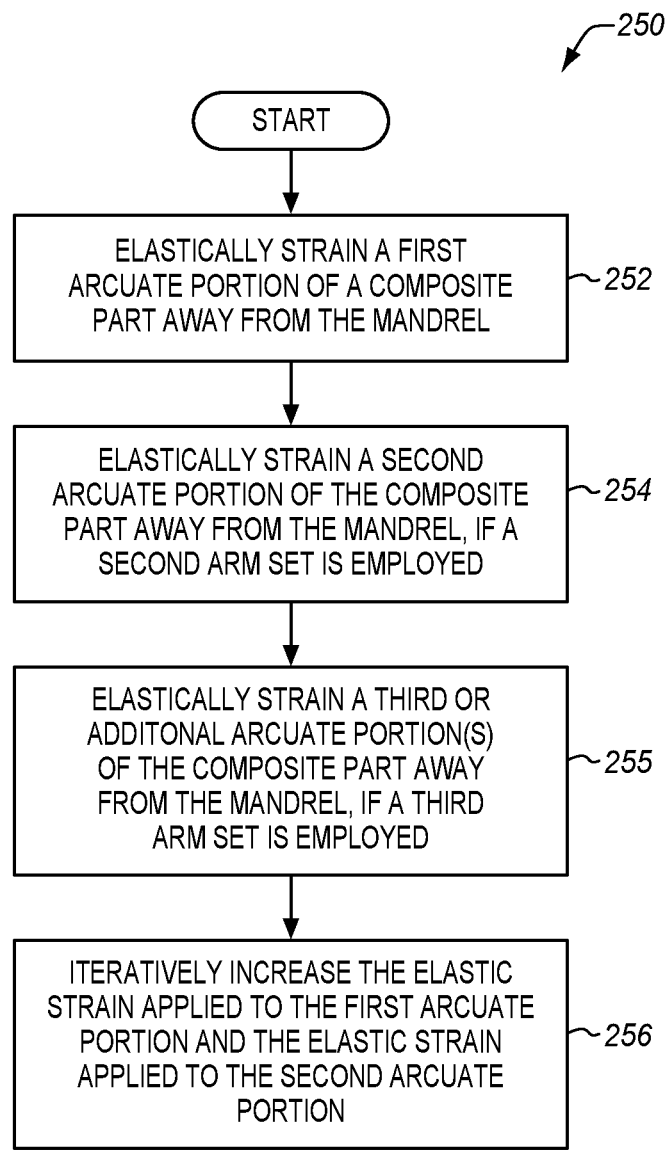

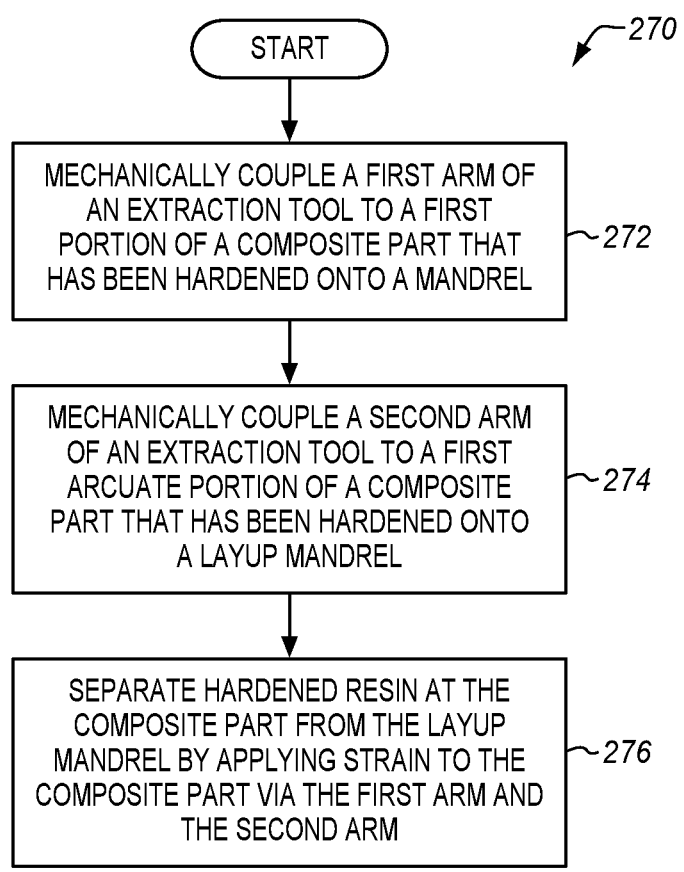

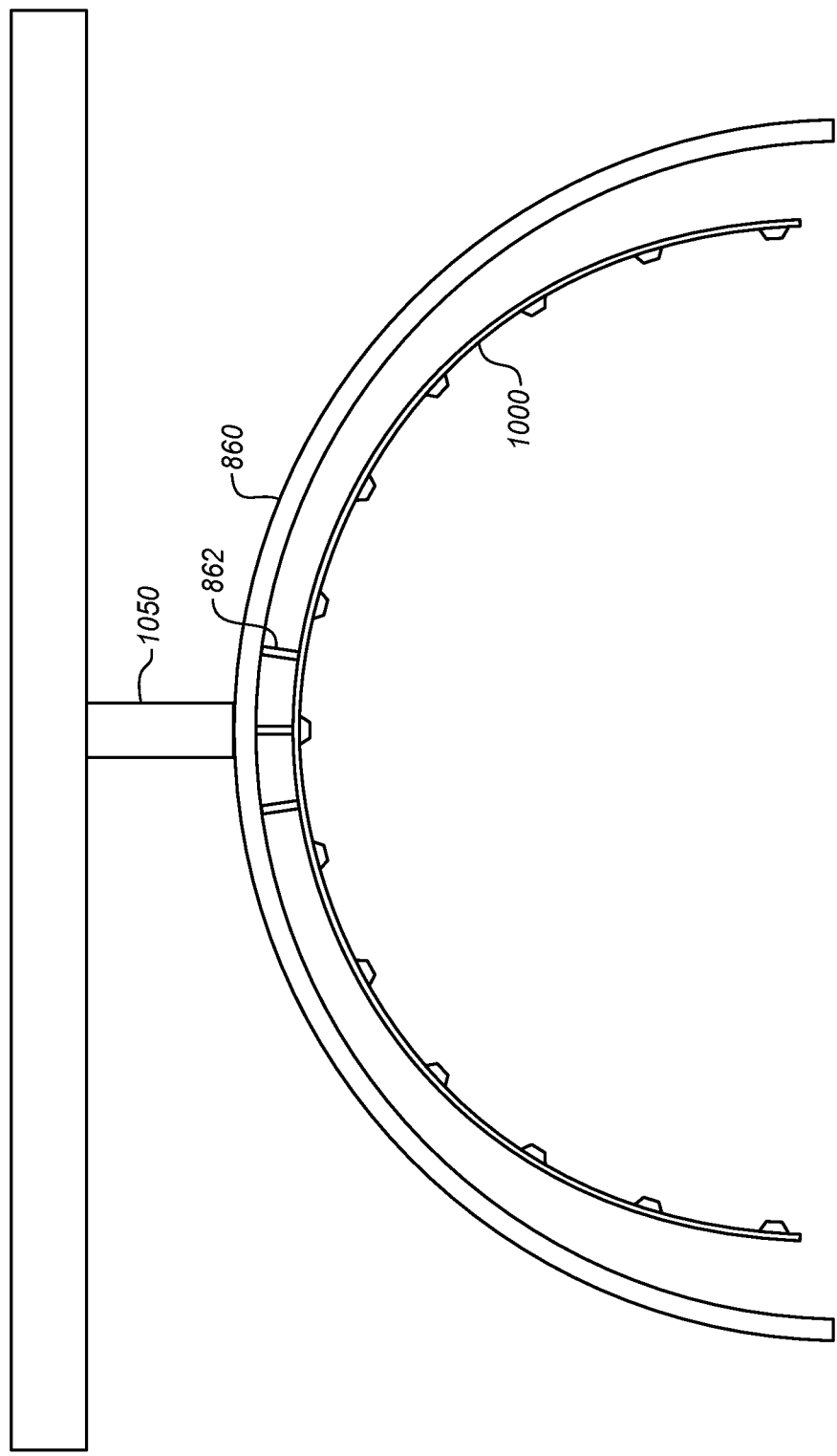

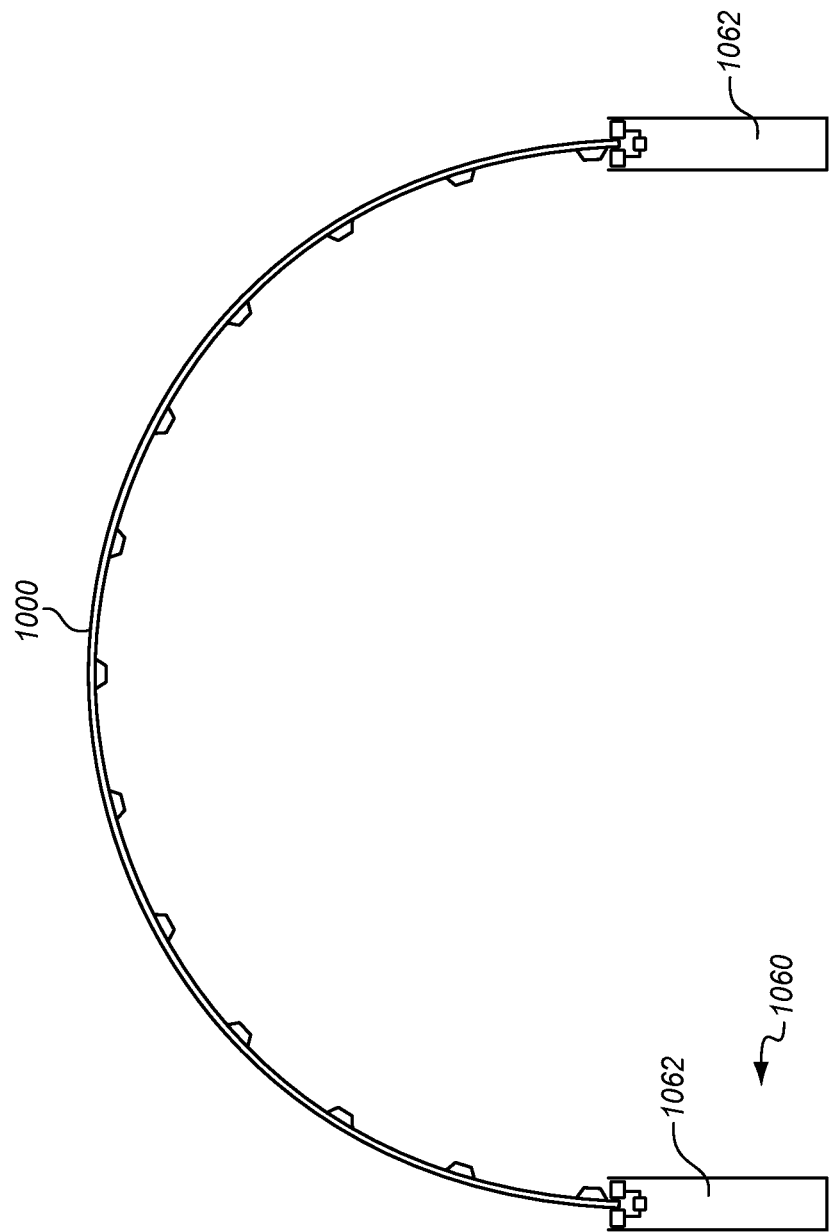

DEMOLDING OF LARGE COMPOSITE PARTS FOR AIRCRAFT

CROSS-REFERENCE TO RELATED APPLICATION

This application claims the benefit of U.S. Provisional Patent Application Ser. No. 63/115,043, filed Nov. 18, 2020, and entitled "Demolding of Large Composite Parts for Aircraft;" which is incorporated herein by reference in its entirety.

FIELD

The disclosure relates to the field of aircraft, and in particular, to fabrication of aircraft components.

BACKGROUND

Large composite parts, such as those spanning tens of feet, occupy substantial space within a factory floor. Laminates for these parts are laid up on a mandrel in a stationary work cell. The mandrel is moved to another stationary work cell and the laminate is hardened-into a composite part. Next, the composite part is removed from the mandrel and transported to a new stationary work cell to receive work.

Removing the composite part from the mandrel may be particularly difficult, as the composite part may have a shape that fills troughs on the surface of the mandrel. One solution is to utilize mandrels composed of multiple separable pieces and disassemble the mandrel and then separate it in pieces form the hardened composite part. However, separating the composite part from a mandrel during the demolding process remains a complex process. Specifically, it is difficult to remove mandrel segments from a cured composite part while keeping strain for the composite part below a desired amount. Furthermore, segmented mandrels are expensive to design owing to their complexity. Seams between pieces of such mandrels may also cause undesirable ridges, bridges or valleys in the hardened composite part, which may result in a need for reworking of the composite part post demold. Another solution is to fabricate composite parts with less complex geometries that are easily separated from the mandrel when hardened. Furthermore, in certain fields such as aerospace, it is not feasible to reduce the complexity of curves in a composite part as a reduced complexity composite part may not have the desired performance. These issues are amplified for large composite parts.

Therefore, it would be desirable to have a method and apparatus that take into account at least some of the issues discussed above, as well as other possible issues.

SUMMARY

Embodiments described herein provide systems and methods for dynamically demolding a composite part from a mandrel, by iteratively applying elastic strain to individual arcuate sections of the composite part. By applying strain that is elastic, the composite part is flexed without permanently changing in shape. By iteratively applying the strain to varying sections of the composite part (e.g., in varying and increasing degrees), the composite part is rocked, twisted, and/or flexed off of the mandrel without permanently bending or deforming.

One embodiment is a method for demolding a composite part from a mandrel. The method includes mechanically coupling a first arm of an extraction tool to a first arcuate portion of a composite part that has been hardened onto a mandrel, mechanically coupling a second arm of an extraction tool to a second arcuate portion of the composite part, and separating the composite part from the mandrel by iteratively performing the following operations until the composite part no longer contacts the mandrel: elastically straining the first arcuate portion of the composite part via the first arm, and elastically straining the second arcuate portion of the composite part via the second arm.

A further embodiment is a non-transitory computer readable medium embodying programmed instructions which, when executed by a processor, are operable for performing a method of demolding a composite part from a mandrel. The method includes mechanically coupling a first arm of an extraction tool to a first arcuate portion of a composite part that has been hardened onto a mandrel, mechanically coupling a second arm of an extraction tool to a second arcuate portion of the composite part, and separating the composite part from the mandrel by iteratively performing the following operations until the composite part no longer contacts the mandrel: elastically straining the first arcuate portion of the composite part via the first arm, and elastically straining the second arcuate portion of the composite part via the second arm.

A further embodiment is a system for demolding a composite part from a mandrel. The system includes a first arm comprising: a flexural member that is complementary to a contour of a composite part that has been hardened onto a mandrel; and gripping units that are disposed along the flexural member and that mechanically couple with a first arcuate portion of the composite part. The system also includes a second arm comprising: a flexural member that is complementary to a contour of the composite part, and gripping units that are disposed along the flexural member and that mechanically couple with a second arcuate portion of the composite part. The system also includes a drive unit that selectively rotates the first arm and the second arm, resulting in elastic strain being iteratively applied to the first arcuate portion and the second arcuate portion.

A further embodiment is a method for demolding a composite part. The method includes elastically straining a first arcuate portion of a composite part away from a mandrel, elastically straining a second arcuate portion of the composite part away from the mandrel, and iteratively increasing the elastic strain applied to the first arcuate portion and the elastic strain applied to the second arcuate portion.

A further embodiment is a method of separating a composite part from a mandrel. The method includes separating a composite part from a mandrel via an extraction tool that iteratively elastically deflects arcuate portions of the composite part, transporting the composite part via the extraction tool to a track, and depositing the composite part onto the track.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 2A-2C are flowcharts illustrating methods for demolding a composite part from a mandrel in illustrative embodiments.

FIGS. 10A-10E depict transport of a composite part to a track via conveyances in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform or laminate. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to curing. For thermoset resins, the hardening is a one-way process referred to as curing, while for thermoplastic resins, the resin reaches a viscous form if it is re-heated.

Figure 1:
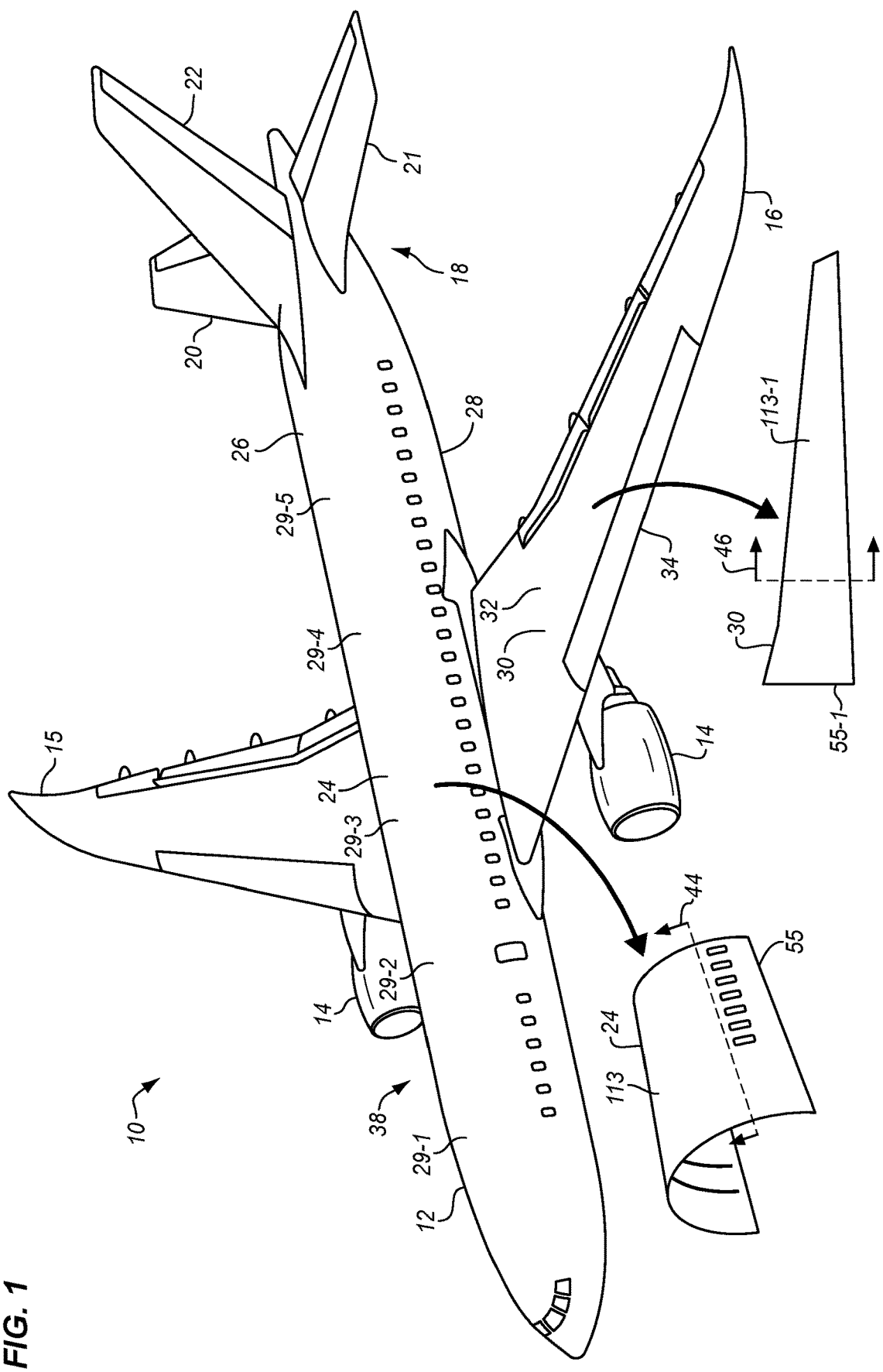
FIG. 1 is a perspective drawing of an aircraft in an illustrative embodiment

Turning now to FIG. 1, an illustration of an aircraft is depicted in which an illustrative embodiment may be implemented. Aircraft 10 is an example of an aircraft which can be formed from caul plates. Aircraft 10 is an example of an aircraft 10 which is formed of half-barrel sections 24 of fuselage 12.

In this illustrative example, aircraft 10 has wing 15 and wing 16 attached to body 38. Aircraft 10 includes engine 14 attached to wing 15 and engine 14 attached to wing 16.

Body 28 has tail section 18. Horizontal stabilizer 20, horizontal stabilizer 21, and vertical stabilizer 22 are attached to tail section 18 of body 38.

Fuselage 12 is fabricated from half-barrel sections 24 with an upper half-barrel section 26 joined to a lower half-barrel section 28 to form a full barrel section 29-1, 29-2, 29-3, 29-4, 29-5. The full barrel sections are joined serially to form fuselage 12.

Wing 15 and 16 are formed of wing panels 30 comprising upper wing panel 32 and a lower wing panel 34 joined together. Section cut 46 is a cut through of wing panel 32 and corresponds to unhardened preform 189, 189-1 (FIGS. 1C and 1F). Section cut 46 is orientated chord wise roughly perpendicular to stringer 182.

Section cut 44 is a cut through composite part 55 and corresponds to half-barrel section preform 24-1 (FIG. 3) prior to hardening. Section cut 44 is orientated longitudinally 181 through a contour 112-1 along a stringer.

Figure 1A:
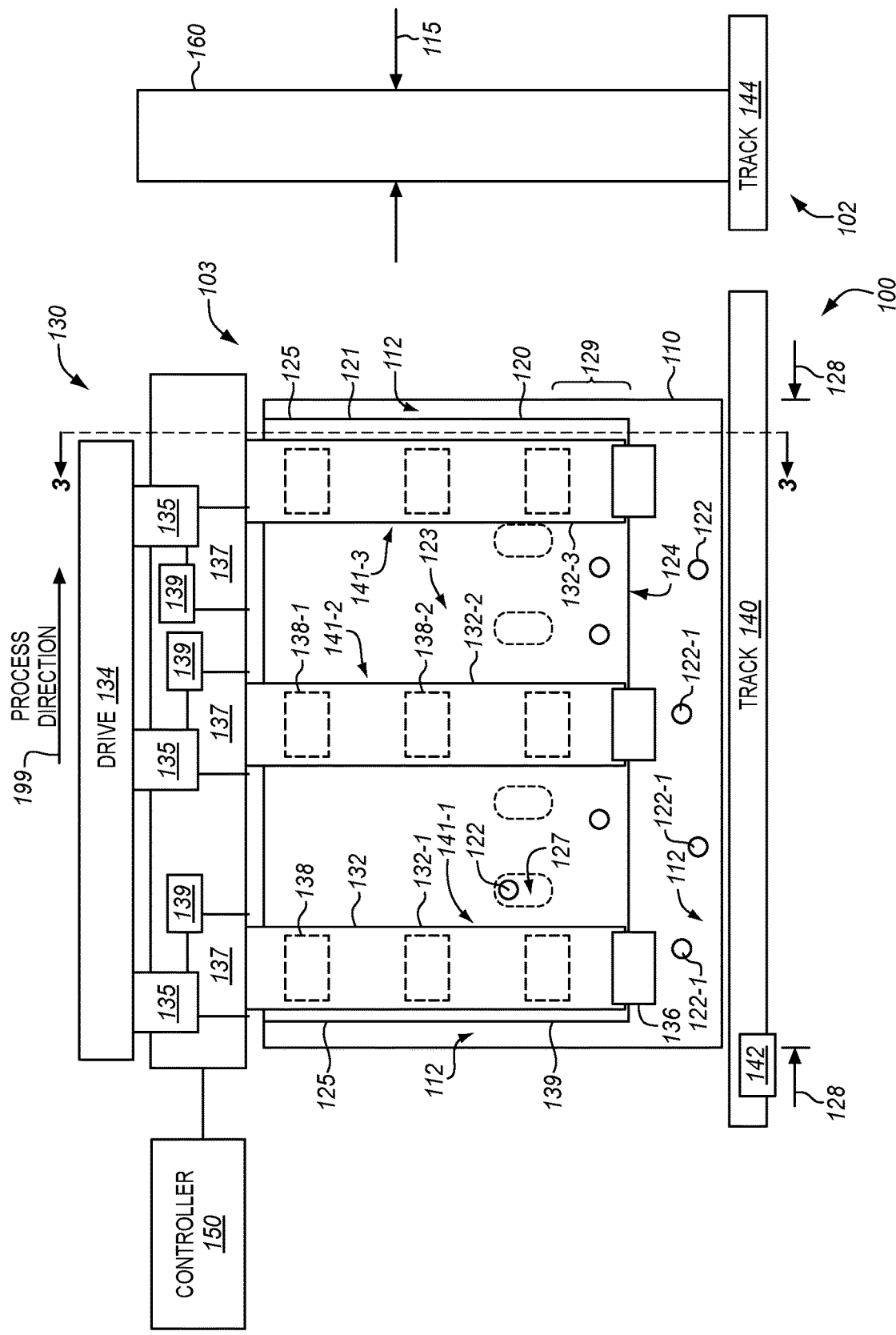
FIG. 1A is a block diagram of a demolding station for separating a composite part from a mandrel in an illustrative embodiment.

FIG. 1A is a block diagram of a demolding station 100 for separating a composite part 120 (comprising fibers and hardened resin 123) from a mandrel 110 in an illustrative embodiment. The mandrel 110 defines a contour for the composite part 120, which may be a half-barrel section of aircraft fuselage, an aircraft wing, etc. The mandrel 110 comprises a metal tool that is capable of withstanding heat and pressure applied during hardening of the composite part. The demolding station 100 comprises any system, device, or component operable to demold a contoured composite part 120, and in particular a half-barrel section 121, from a surface 112 of the mandrel 110.

Within indexing feature addition and demold station 100, composite part 120, and in particular half-barrel section 121, are illustrated with flash edges and/or manufacturing excess trimmed to leave a bearing edge 124 or a final trim edge 125. The trimming is performed prior to demold and therefore while the composite part 120 is still on mandrel 110. Indexing features 122 are also installed in the indexing feature addition and demold station 100 prior to demold.

The mandrel 110 proceeds in a process direction 199 during fabrication. In this embodiment, the mandrel 110 proceeds along a track 140 (e.g., a series of discrete stanchions having rollers, a rail or set of rails or an AGV mandrel 110, etc.) for an indexing feature addition and demold station 100, and may be full pulsed 128 into and out of this station in the process direction 199. The track 140 serves to convey mandrel 110 into and out of indexing feature addition and demold station 100. The composite part 120 is advanced by a full pulse 128 out of indexing feature addition and demold station 100 and placed upon track 144 and advances by micro pulses 115 through work stations 160 in an assembly line 102 that perform post hardening assembly. Micro pulse 115 is illustrated at the width of work station 160, but micro pulse 115 are contemplated as being other multiples or fractions of work station 160 width. The mandrel 110 may then be returned for cleaning and reconditioning to the start of the layup process, while the composite part 120 proceeds in the process direction 199 through work stations 160 that perform assembly work on the composite part 120. In embodiments where the mandrel 110 is advanced by a micro pulse 115, work is either performed upon the composite part 120 during pauses between micro pulses 115, or during the pulses themselves or during micro pulse 115 and pause between micro pulses 115 or perform no work during either micro pulse 115 or pause between micro pulse 115.

An extraction tool 130 aligns itself to the mandrel 110, and/or to part indexing features 122 in the composite part 120, and/or mandrel indexing features 122-1 which are precisely placed into or onto the composite part 120 or mandrel 110. After alignment to the mandrel 110, the extraction tool 130 places the arm sets 132 against the composite part 120, engages gripping units 138. The vacuum couplers 138-1 that removably join arm sets 132 to composite part 120 and end effectors 138-2 that physically grip the indexing features 122 at the composite part 120, etc. The lips 136 are placed against the bearing edge 124 of the composite part 120. While three arm sets 132 are shown in FIG. 1A, it will be appreciated that because FIG. 1A is a side view, the other half of the arm sets 132 are located other (not shown) side of the extraction tool 130. Furthermore, the number of arm sets 132 disposed on each side as a matter of design choice ranging from one or more depending on a geometry of the composite part 120.

While the part indexing features 122 are shown in a lower portion of the composite part 120, in further embodiments the part indexing features 122 are disposed in a manufacturing excess 127, 129 of the composite part 120 that will eventually be trimmed away, such as edge above the bearing edge 124 of the composite part 120, a manufacturing excess 127 for a window cut-out, a manufacturing excess (not shown) for a door cut-out, or a manufacturing excess (not shown) for an antenna cut-out.

Once the arm sets 132 are coupled to composite part 120, a drive or drive unit 134 (e.g., a motor, actuator, etc.) proceeds to rotate/lift the arm sets 132 upward and away from the mandrel 110 while coupled to composite part 120 as part of the separating process. Rotating and/or lifting of the coupled arm sets 132 results in elastic strain at the composite part 120 by elastically deflecting it to break the bond of the resin with the mandrel 110 and the stringers 332 of composite part 120 (FIG. 4) to a trough 322 (FIG. 3 in the mandrel 110. The separating/lifting process may be performed separately and iteratively in a pulsed fashion introduced by the arm sets 132 into the composite part 120 according to the process direction 199 or its inverse. The separating/lifting process may be performed separately and iteratively in a pulsed fashion introduced by the arm sets 132 into the composite part 120 from lips 136 to actuatable joints 137 in an iterative fashion with one or more arm sets 132. The separating/lifting process may be performed on either side separately and iteratively in a pulsed fashion introduced by the arm sets 132 into the composite part 120. The pulsing operation of the arm sets 132 may be performed at increasing amounts of force or distance in order to slowly peel and break the resin adhesion of the composite part 120 from the mandrel 110. Furthermore, when one arm set 132 is applying force, other arm sets 132 may reduce applied force or stop applying force resulting in an undulating application to composite part 120.

In one embodiment, the drive 134 comprises one or more rotary actuators 135 that rotate actuatable joints 137 about axis 341 (FIG. 3) which are coupled with the arm sets 132. While rotary actuators 135 are discussed and illustrated, a linear application system (not shown) is also envisioned as an alternative or in addition to rotary actuators 135. This rotation causes the arm sets 132 to angularly deflect away from composite part 120. The amount of angular deflection of arm sets 132 is dynamically measured via sensors 139. Because the amount of angular deflection of the arm sets 132 can be used to determine amounts of strain at different locations within the composite part 120 to be demolded. The strain at a particular location can be measured by a number of means such as via bonded-on strain gauges. The strain is imputed to the structure based upon measured deflections of composite part 120 versus mandrel 110. In one embodiment, strain gauge bonding occurs when a part indexing feature 122 is installed and/or Radio Frequency Identifier (RFID) tag is bonded onto the composite part 120, or while trimming or machining the composite part 120 prior to demolding. In further embodiments, strain is determined based upon test data from sensor measurements of d composite part 120 versus deflection during demolding, and impute that data to the composite part 120 being demolded and/or based upon measured deflections of the composite part 120. Because strain is imputed to composite part 120 based upon measured deflections of composite part 120 or strain measurements from composite part 120 during demolding and is capable of being used to control drive 134 managed by a controller 150 to dynamically adjust the amount of angular deflection applied by the arm sets 132 in real time. This process during demolding ensures that desired levels of strain at the composite part 120 are not exceeded.

A controller 150 manages the operations of the extraction tool 130. In this embodiment, the controller 150 includes an interface (e.g., an ethernet interface, Universal Serial Bus (USB) interface, wireless interface, etc.) for communicating with the extraction tool 130, and includes a memory that stores one or more Numerical Control (NC) programs for operating the extraction tool 130. Controller 150 may further process feedback from the extraction tool 130, and provide instructions based on such feedback. For example, controller 150 may individually adjust an amount of force applied by each arm set 132 via drive 134 to composite part 120. The demolding force applied by each of the arm sets 132 achieve the desired amounts of strain within composite part 120. Controller 150 may determine the amount of strain based on a measured deflection of each of the arm sets 132. In this manner, controller 150 ensures that the arm sets 132 either work in unison and create a uniform elastic strain on an entire side of the composite part 120, or in a synchronized manner that creates a wave effect. A wave effect in composite part 120 is created when a first arm set 132-1 imparts a first amount of elastic strain in a first portion 141-1 of composite part 120, and then an elastic strain level in a second portion 141-2 of composite part 120 imparted by a second arm set 132-2 is increased to a second amount. The elastic strain imparted into the first portion 141-1 is maintained at the first amount or reduced when the elastic strain imparted into the second portion 141-2 is increased to the second amount. And then an elastic strain level in a third portion 141-3 of composite part 120 imparted by a third arm set 132-3 is increased to a third amount while either maintaining elastic strain in the first portion 141-1 or the second portion 141-2 at the first amount or second amount, respectively, or reducing either or both. By iteratively applying higher strain via either technique, the cured resin of the composite part 120 is separated from the mandrel 110 especially components of the composite part 120 that are partially surrounded by the mandrel 110, such as stringers 332 in troughs 322 within mandrel 110.

Controller 150 may be implemented, for example, as custom circuitry, as a hardware processor executing programmed instructions, or some combination thereof.

Track 140 guides the mandrel 110 in the process direction 199, and may comprise rollers 312 (FIG. 3), rails, or other components that facilitate movement of the mandrel 110. The track 140 includes a drive 142 (e.g., a chain drive or other component) to move the mandrel 110 in one embodiment, while in further embodiments an Autonomous Guided Vehicle (AGV) is used to move the mandrel 110 either on track 140 or without a track. In one embodiment, the track 144 is also used to move the composite part 120, after the composite part 120 has been demolded and placed into position by the extraction tool 130.

After the composite part 120 has been demolded and moved in the process direction 199, it may receive work such as frame installation, window cut-out operations, fastening to other composite parts, etc. at downstream work stations 160. The mandrel 110 may be returned to a cleaning station (not shown). For example, the mandrel 110 may be sent to return line 103 and advanced in a pulse or micro pulse to reprocess it for reuse via cleaning, and resurfacing before receiving another laminate for hardening into a composite part 120.

Illustrative details of the operation of demolding station 100 will be discussed with regard to FIG. 2A. Assume, for this embodiment, that the mandrel 110 has received a laminate, and that heat and pressure has been applied to harden the laminate onto the mandrel 110 in order to form the composite part 120.

FIG. 2A is a flowchart illustrating a method 200 for demolding a composite part 120 from a mandrel 110 in an illustrative embodiment. The steps of method 200 are described with reference to demolding station 100 of FIG. 1A, but those skilled in the art will appreciate that method 200 may be performed in other systems. The steps of the flowcharts described herein are not all inclusive and may include other steps not shown. The steps described herein may also be performed in an alternative order.

Step 202 comprises mechanically coupling a first arm (350) of the extraction tool 130 to a first portion 141-1 of a composite part 120 that has been hardened upon mandrel 110. In one embodiment, the composite part 120 is a half-barrel section 121 of fuselage that includes a skin 331 (FIG. 3) and stringers 332. For example, step 202 may include activating gripping units 138 to secure an arm set 132 to the composite part 120. These operations are depicted, for example, in FIG. 3. If the gripping units 138 comprise vacuum device, such as vacuum couplers 343 shown in FIG. 3, this comprises engaging the vacuum couplers 343 to form a vacuum chamber 345 defined/formed in part by the composite part 120. Then evacuating vacuum chamber 345 coupling gripping unit 342 to skin 331 of composite part 120. That is, mechanically coupling a first arm 350 to a first portion 141-1 may comprise placing a vacuum coupler 343 at the first arm set 132-1, comprising first arm 350 and second arm 360, into contact with the first portion 141-1. If the gripping units 138 comprise another type of end effector such as a pin, claw, or finger, this comprises mechanically mating the gripping units 138 to the part indexing features 122.

In one embodiment, lips 136 are coupled with the bearing edge 124 in order to align the gripping units 138, prior to the application of vacuum to engage the vacuum couplers 343 and the gripping units 138 with composite part 120. In this manner, lips 136 provide a general alignment of arm set 132 with composite part 120 for the gripping units 138 before the gripping units 138 are engaged.

Step 204 comprises mechanically coupling a second arm set 132-2, comprising first arm 350 and second arm 360 of the extraction tool 130 to a second portion 141-2 of the composite part 120, and may be performed in a similar manner to step 202 described above.

In step 206, drive 134 initiates separation of the composite part 120 from the mandrel 110 by performing the following operations until the composite part 120 is separated from the mandrel 110. The operations include iteratively flexing the arms sets 132 to elastically strain the first portion 141-1 and second portion 141-2 of the composite part 120 in sequence away from the mandrel 110, and adjusting and/or increasing the degree of elastic strain over a period of time as the arm sets 132 are iteratively manipulated to separate composite part 120 from mandrel 110. In this manner, elastic strain is applied to the composite part 120 over a period of time, via the vacuum couplers 343 and the lips 136 of the extraction tool 130. Specifically, the extraction tool 130 elastically strains the first portion 141-1 of the composite part 120 via a first arm set 132-1 in step 208, and elastically strains the second portion 141-2 of the composite part 120 via a second arm set 132-2 in step 210. In one embodiment, the arms elastically strain both first portion 141-1 and second portion 141-2 at once, while in another embodiment one or more first arms 350 on one side apply strain, followed by one or more second arms 360 at another side. In one embodiment, the amounts of strain, deflection, and/or force applied are cyclically ramped upwards and downwards by each arm, in cycles that are out of phase. Furthermore, these amounts of strain, deflection, and/or force may be slowly increased in value even as they continue to vary cyclically. Thus, in one embodiment, the elastic strain is iteratively increased by alternatingly increasing strain applied to the first arcuate portion 334, and increasing the elastic strain applied to the second arcuate portion 336. The iterative strain applied separates bond of resin at the composite part 120 from the mandrel 110.

In one embodiment, determining that the composite part 120 is separated from mandrel 110 is based on a reduction in resistance to translation of the composite part 120. That is, once the composite part 120 translates in response to applied forces into or out of the page of FIG. 3, the resin at the composite part 120 is released/separated from the mandrel 110, and hence the composite part 120 is demolded.

The action of the arm sets 132 causes the composite part 120 to start to separate from the mandrel 110 by degrees, which enables separation of composite parts 120 that have complex shapes such as stringers 332, insets and pad-ups. For example, in embodiments where the mandrel 110 includes troughs 322 for stringers beneath a half-barrel section 121, composite material may be successfully extracted from these troughs without causing out of tolerance conditions at the composite part 120 which would necessitate rework.

From this point, a lifting device may lift the arm sets 132 and the composite part 120 from the mandrel 110, and/or the mandrel 110 may be moved/advanced out from beneath the composite part 120 to return line 103.

Method 200 provides a technical benefit over prior techniques and systems, because it enables massive complex composite parts 120, particular unique structures like half-barrel section 121, to be effectively and efficiently separated from mandrel 110, and without resorting to mandrel tooling that must be separate or otherwise disassembles to effect separation from composite part 120 during the demolding process. This reduces the expense and complexity of associated mandrels 110, while further reducing labor associated with the disassembly and re-assembly of such mandrels. The time needed to demold the composite part 120 from mandrel 110 is less than the time needed to demold by disassembling the mandrel 110.

FIG. 2B is a flowchart illustrating a further method 250 for demolding composite part 120 from mandrel 110 in an illustrative embodiment. Step 252 comprises elastically straining a first portion 141-1 of composite part 120 away from mandrel 110. Step 254 includes elastically straining a second portion 141-2 of the composite part 120 away from the mandrel 110, if a second arm set 132-2 is employed and is performed at the same time as step 252 or at a different time from step 252. Step 255 includes elastically straining a third portion 141-3 or additional portions of the composite part 120 away from the mandrel 110, if a third arm set 132-3 is employed and is performed at the same time as step 252 or at a different time from step 252. Step 256 comprises iteratively increasing the elastic strain applied to the first portion 141-1 and the elastic strain applied to the second portion 141-2 and a third portion 141-3. In a further embodiment, elastically straining the first portion 141-1 is performed by gripping the composite part 120 with gripping unit 342 onto skin 331 and lip 346 to bearing edge 124 of the first portion 141-1. In this manner, elastically straining the first portion 141-1, second portion 141-2 and third portion 141-3 is performed through lip 346 into the bearing edge 124 first and then upward through composite part 120 using gripping unit 342 through skin 331, as applicable. Another version comprises elastically straining the first portion 141-1, second portion 141-2 and third portion 141-3 is performed through gripping unit 342 onto skin 331 initially and then via lip 346 into the bearing edge 124 downwards through composite part 120, as applicable.

In a further embodiment, iteratively increasing the elastic strain comprises alternately increasing the elastic strain applied to the first arcuate portion, and increasing the elastic strain applied to the second arcuate portion 336.

FIG. 2C is a flowchart illustrating a further method 270 for demolding a composite part from a mandrel 110 in an illustrative embodiment. Step 272 includes mechanically coupling a first arm set 132-1 of an extraction tool 130 to a first portion 141-1 of a composite part 120 that has been hardened onto a mandrel 110. Depending on design specifications, this may comprise applying vacuum coupling to the composite part 120 via vacuum couplers 343 at the first arm set 132-1, or coupling to composite part 120 via part indexing features 122, 122-1. Step 274 comprises mechanically coupling a second arm set 132-2 of an extraction tool 130 to a second portion 141-2 of the composite part 120, and may be performed in a similar manner to step 272 above. Step 276 includes separating/releasing hardened resin at the composite part 120 from the mandrel 110 by applying strain to the composite part 120 via the first arm set 132-1 and the second arm set 132-2. In one embodiment separating the hardened resin includes separating hardened resin between a stringer 332 of the composite part 120 from the trough 322 of mandrel 110.

Controller 150 determines that the hardened resin has separated from the mandrel based on a reduction in resistance to translation of the composite part 120 from the mandrel 110. For example, when there is no longer any added resistance to movement of the composite part 120 due to resin adhesion to mandrel 110, it can be concluded that the resin has separated from the mandrel 110.

Figure 3:
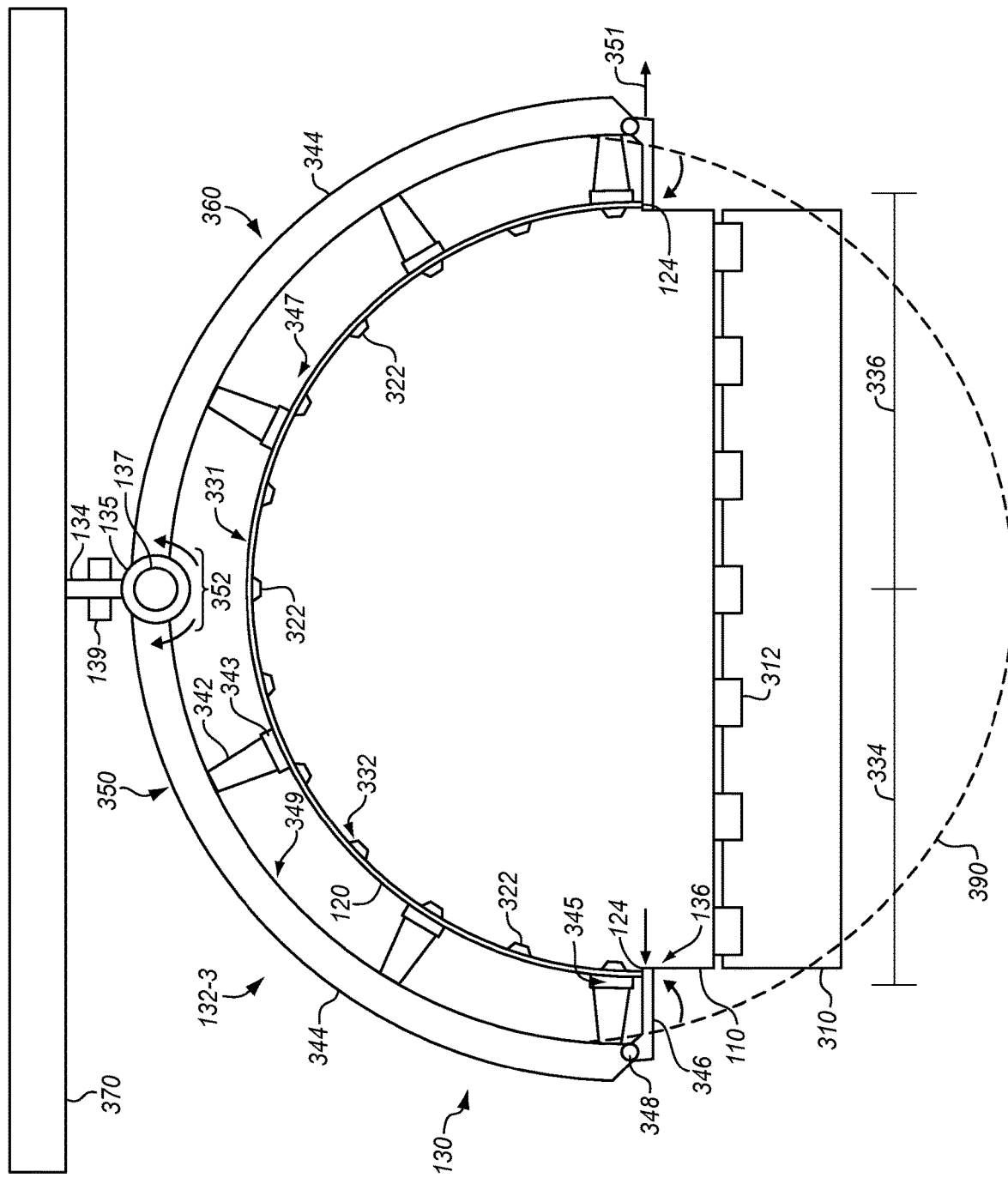
FIGS. 3-7 depict an extraction tool that iteratively elastically deflects arcuate portions of a composite part in an illustrative embodiment.

FIGS. 3-7 depict an extraction tool 130 that iteratively elastically deflects composite part 120 comprising a half-barrel section 121 in an illustrative embodiment. These views correspond with view arrows 3 of FIG. 1A. In FIG. 3, a cross sectional view, the extraction tool 130 is placed over the composite part 120, which includes skin 331 and stringers 332. Drive 134, rotary actuators 135, actuatable joint 137 and sensors 139 are illustrated in block form. The drive 134 comprises one or more rotary actuators 135 that rotate actuatable joints 137 about axis 341 (FIG. 3) which are coupled with the arm sets 132. While rotary actuators 135 are discussed and illustrated, a linear application system (not shown) is also envisioned as an alternative or in addition to rotary actuators 135. This rotation causes the arm sets 132 to angularly deflect away from composite part 120. The amount of angular deflection of arm sets 132 is dynamically measured via sensors 139. The stringers 332 are presently held within troughs 322 (e.g., indents) at a mandrel 110. The mandrel 110 moves in a process direction 199 into the page along rollers 312 at a track 140. Another embodiment has an AGV (not shown) instead of rollers 312.

In this embodiment, the extraction tool 130 includes first arm set 132-1, second arm set 132-2, and third arm set 132-3 for demolding first portions 141-1, second portion 141-2 and third portion 141-3 of the composite part 120, respectively. Each of the arm sets 132 includes a flexural member 344, as well as gripping units 342, and a lip 346 coupled by a hinge 348 to flexural member 344. The flexural member 344 is contoured 349 to be complementary to the contour 347 of the composite part 120. Thus, in this embodiment, it forms an arc-(as shown in FIG. 3-7). In a further embodiment, the arcs formed by the first arm set 132-1, the second arm set 132-2 and third arm set 132-3 occupy different portions of the same circle 390. In a further embodiment, multiple arms are disposed at each of the portions of the circle 390. The lip 346 is held in contact with bearing edge 124 of the composite part 120 via application of bias or other means and facilitates application of peel force 351 through the lip 346 via hinge 348 from extraction tool 130.

One or more actuatable joints 137 are disposed between the first arm 350 and the second arm 360, mechanically coupling/uniting these components while enabling rotation 352 about axis 341. Gripping units 342 are distributed along the flexural member 344. Gripping units 342 are sandwiched between flexural member 344 and contour 347 when extraction tool 130 is removably attached to composite part 120. Gripping units 342 may comprise vacuum couplers 343 (e.g., vacuum couplers vacuum attach gripping unit 342 to the composite part 120 to form a vacuum chamber 345. Another embodiment has end effectors 138-2 arrayed along flexural member 344 that physically grip part indexing features 122, 122-1 that have been incorporated into or integrated into the design of the composite part 120). These indexing features 122, 122-1, not shown in FIGS. 3-7, may comprise holes, slots, notches, etc. and not specifically illustrated in FIG. 1A. A lifter 370 is shown for lifting the extraction tool 130 and the composite part 120 after extraction has been completed.

Figure 4:
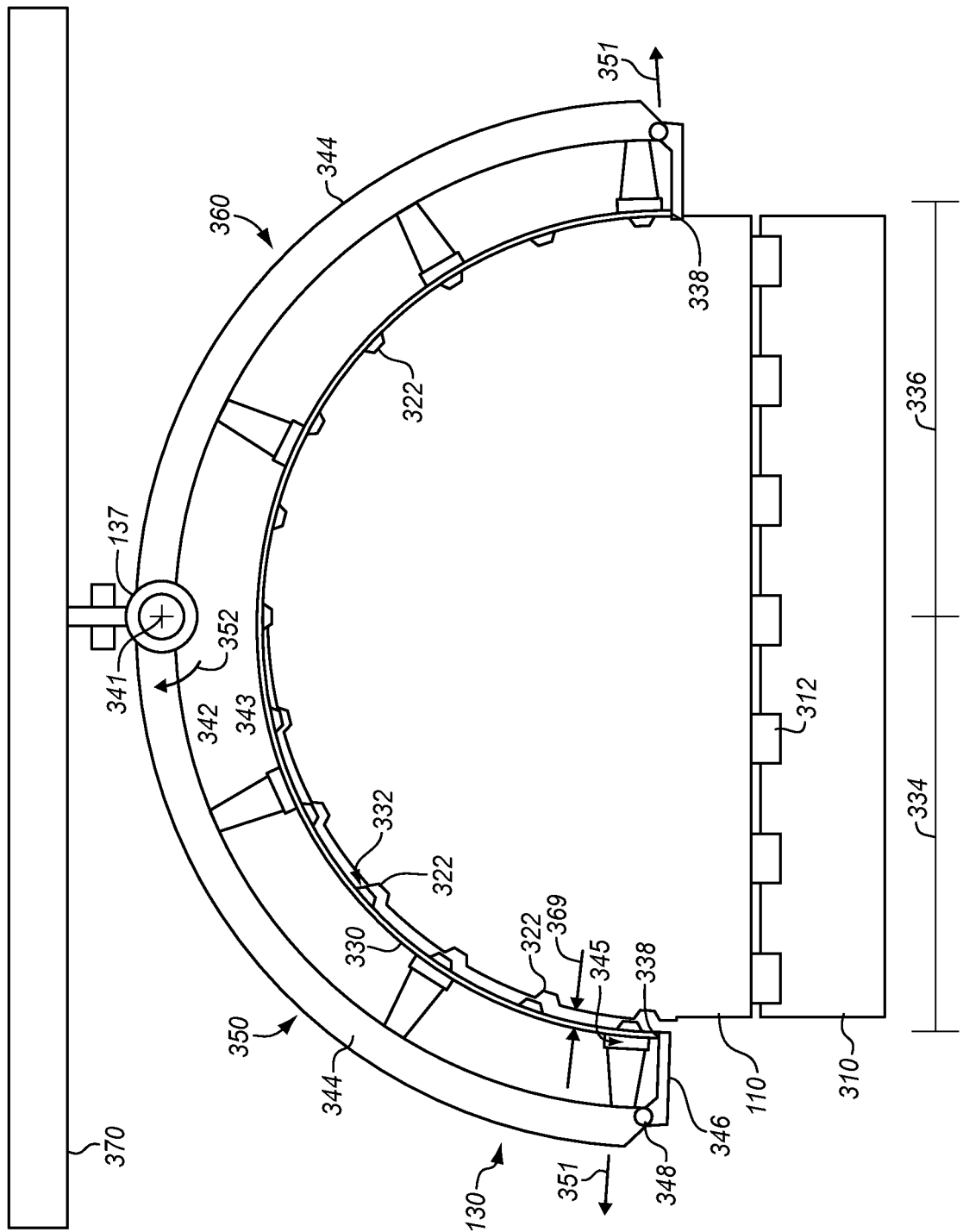

In FIG. 4, the first arm 350 is driven outward and upward, away from a surface of the mandrel 110. This separates the arcuate portion 334 from the mandrel 110. In this manner, the first arm 350 and the second arm 360 separate hardened resin coupling the composite part 120 with mandrel 110 by applying strain to the composite part 120 that deflects or peels the composite part 120 from the mandrel 110. A gap 369 is illustrated between composite 120 and mandrel 110 along first arm 350.

Figure 5:
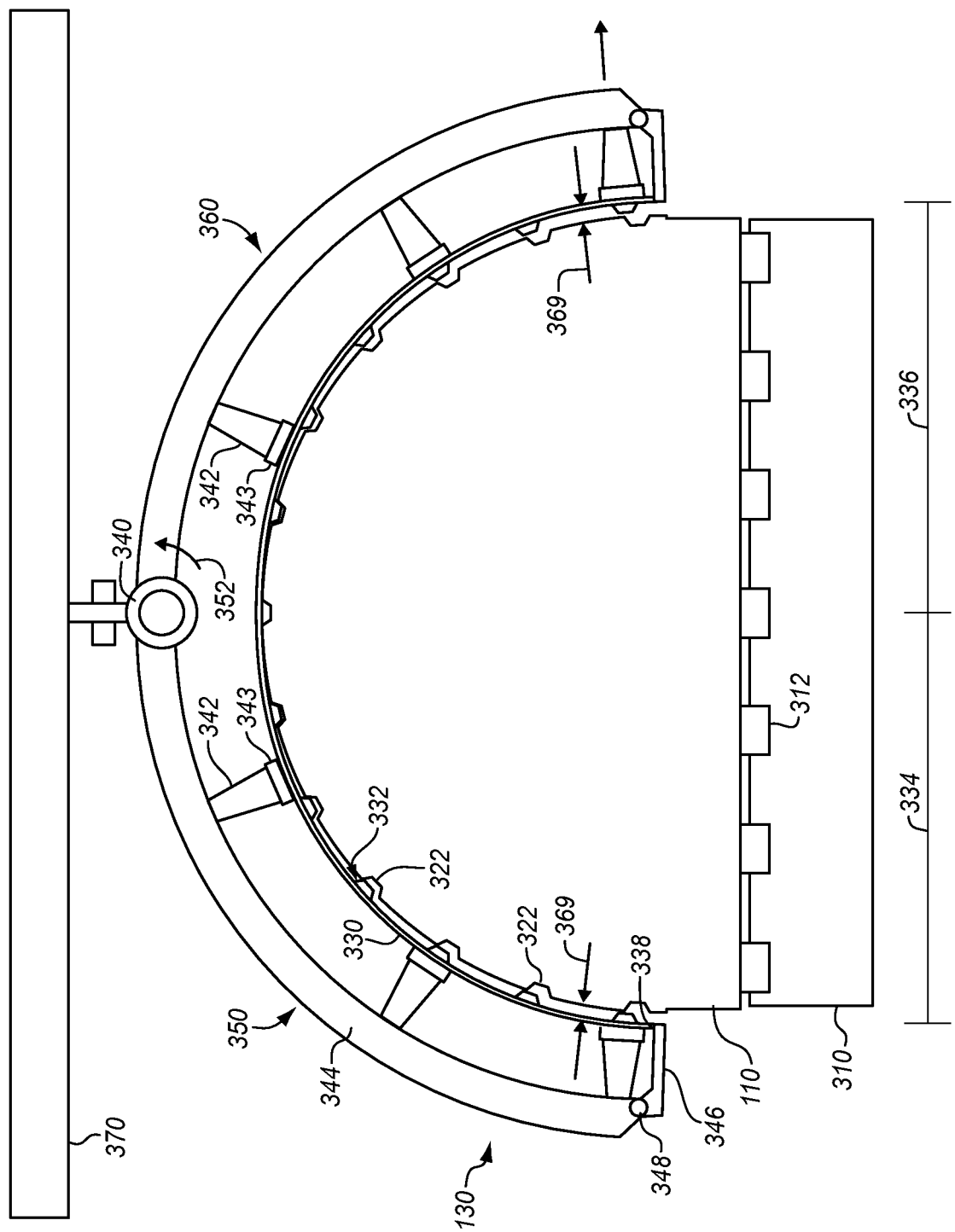

In FIG. 5, the second arm 360 is driven outward and upward, which separates the arcuate portion 336 from the mandrel 110. While the operations of FIGS. 4-5 are illustrated as singular motions, in further embodiments these operations are iteratively and incrementally performed in a cyclic or pulsed fashion, such that the first arm 350 and then the second arm 360 rotate 352 by a small angle, for instance five degrees and/or a distance of one to three inches, etc., and then iteratively increase deflection to larger angles, such as increasing by five degrees or one to three inches, etc. in a rocking pattern until demolding has been completed. The same iterative process is possible when moving from third arm set 132-3, to second arm set 132-2 and possibly iteratively into first arm set 132-1. That is, the operation is performed until the composite part 120 has separated from the mandrel 110, and the stringers 332 have separated from the troughs 322. A gap 369 is illustrated between composite part 120 and mandrel 110 along both first arm 350 and second arm 360. In a further embodiment, when one of the first arms 350 or second arms 360 is applying force to the composite part 120, the other first arm 350 or second arm 360 reduces or removes applied forces, to ensure that amounts of strain applied to the first portion 141-1, third portion 141-3 remain elastic and do not result in permanent deformation of the composite part 120. In one embodiment, this comprises releasing elastic strain on the composite part, causing the composite part to elastically return to a shape defined by the mandrel 110 upon demold.

Figure 6:
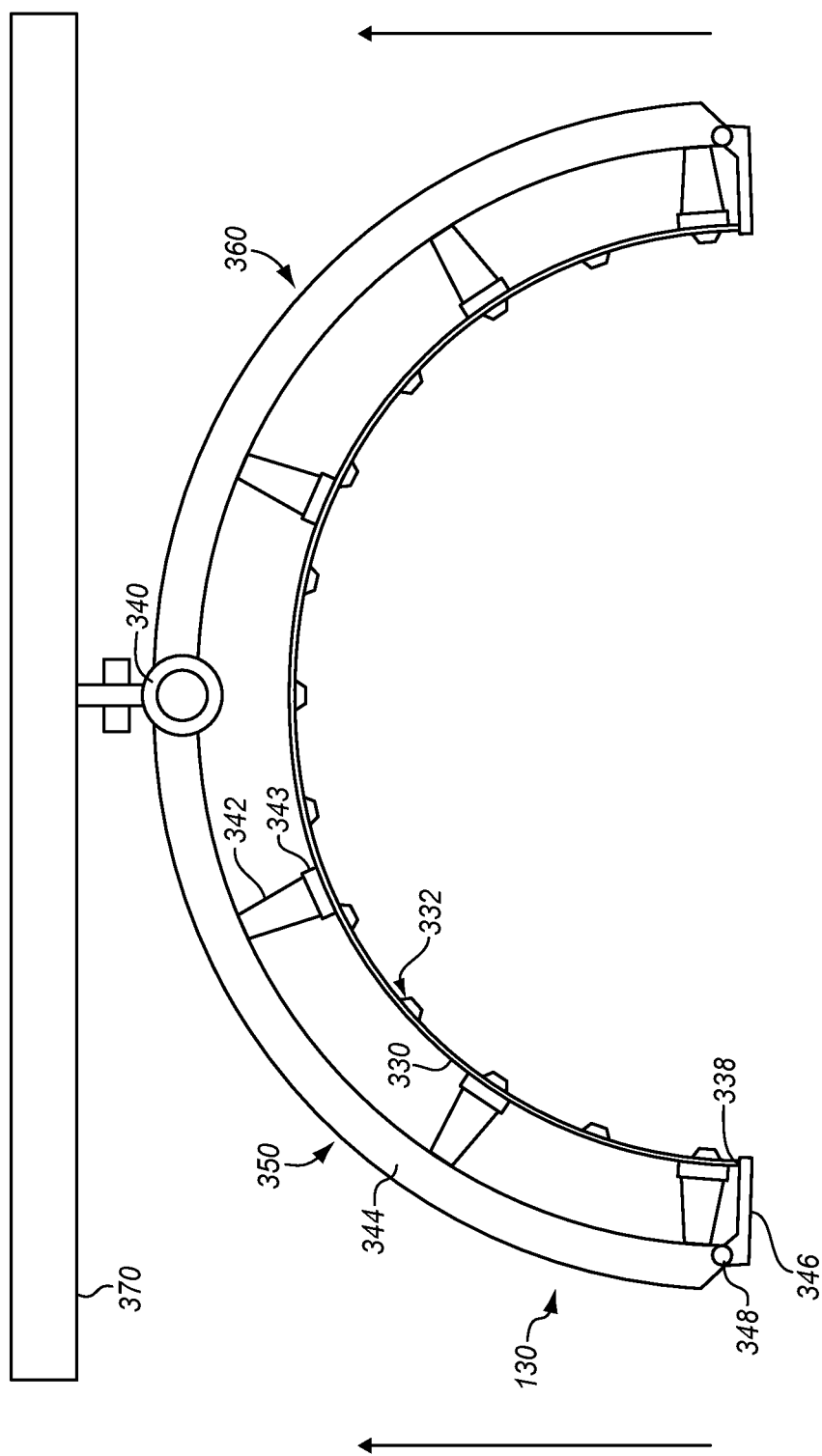

In FIG. 6, the mandrel 110 is removed and sent to return line 103. In one embodiment, this operation is performed by driving the mandrel 110 into or out of the page after a minimum amount of clearance, for instance enough clearance to cause passage of the stringers 332 from the troughs 322 between the mandrel 110 and the composite part 120 has been achieved. In a further embodiment, the extraction tool 130 is lifted away with composite part 120 from the mandrel 110 via the operation of lifter 370 after demolding has been completed.

Figure 7:
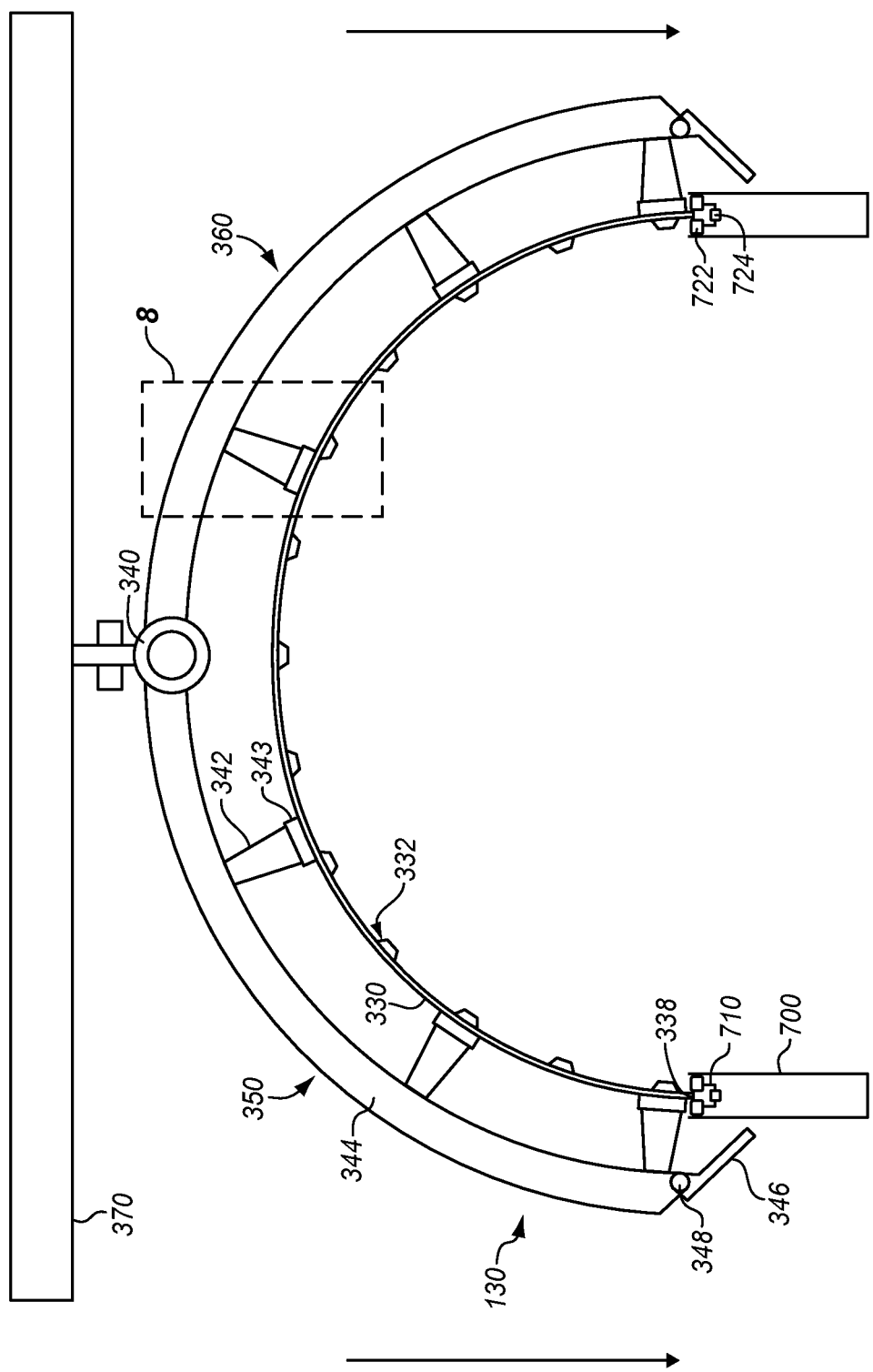

The extraction tool 130 is then moved to a new location shown in FIG. 7 and elastic strain is removed. The composite part 120 is poised above a track comprising stanchions 700 which retain the composite part 120 in grooves 710, while enabling motion of the composite part 120 in the process direction 199 into the page along rollers 724. In one embodiment, lips 346 are lowered via hinges 348 to expose the edge 338 while vacuum couplers 343 continue to apply suction and the composite part 120 is poised above the stanchions 700. Lowering the lips 346 further prevents the lips 346 from contacting the stanchions 700 (and any rollers disposed at the stanchions 700). The exposed edge 338 is then lowered into position into grooves 710, between the pinch rollers 722 and onto rollers 724. In one embodiment the weight of composite part 120 is conveyed through bearing edge 124 and is borne by rollers 724, while in a further embodiment, pinch rollers 722 hold the bearing edge 124 in position. The grooves 710 help to conform the composite part 120 to a desired shape and contour 347 even though the mandrel 110 has been removed. The lips 346 release and uncouple during this process, enabling the bearing edges 124 of the composite part 120 to be placed in position within the grooves 710. The extraction tool 130 then releases the gripping units 342, and returns to retrieve another composite part 120 from another mandrel 110. The composite part 120 proceeds in the process direction 199 to downstream work stations 160, which install frames, assembly the composite part together with other composite parts, cut out windows and doors, and perform other tasks.

While extraction tool 130 is illustrated as separating a composite part 120 in the form of a half-barrel section 121, the iterative and cyclic technique for elastically flexing the composite part 120 from a mandrel 110 may be performed for other composite parts, such as sections of wings, nacelles, etc.

Figure 8:
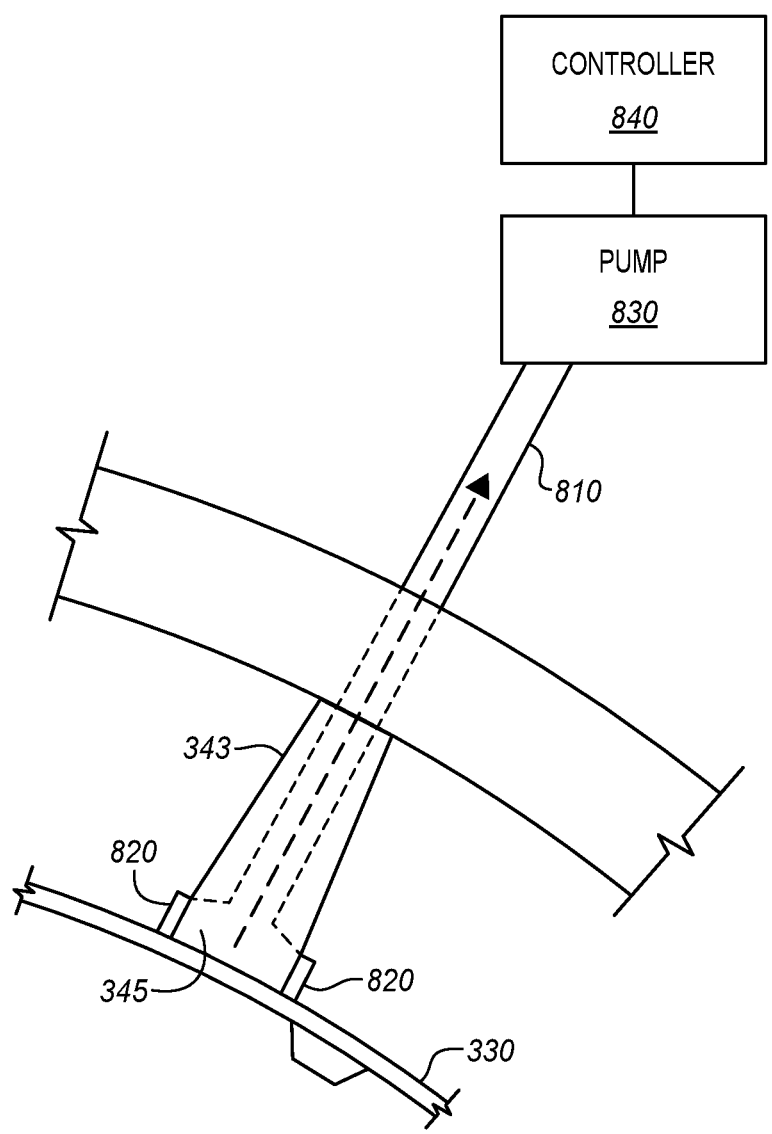
FIG. 8 is a zoomed in view of a vacuum coupler of an arm of an extraction tool in an illustrative embodiment.

FIG. 8 is a zoomed in view of a vacuum coupler 343 of an arm of an extraction tool in an illustrative embodiment, and corresponds with region 8 of FIG. 7. In FIG. 8, a vacuum coupler 343, forms a vacuum chamber 345 that is bounded by flexible elements 820 (e.g., rubberized components that conform to the surface geometry of the composite part 120. Suction forces travel via tubing 810 to pump 830, which evacuate vacuum chamber 345 in each of one or more vacuum couplers 343, and is controllably operated by controller 840 to consistently apply a desired amount of vacuum. The evacuated vacuum chamber removeably couples vacuum coupler 343 and extraction tool 130 to composite part 120.

Figure 9:
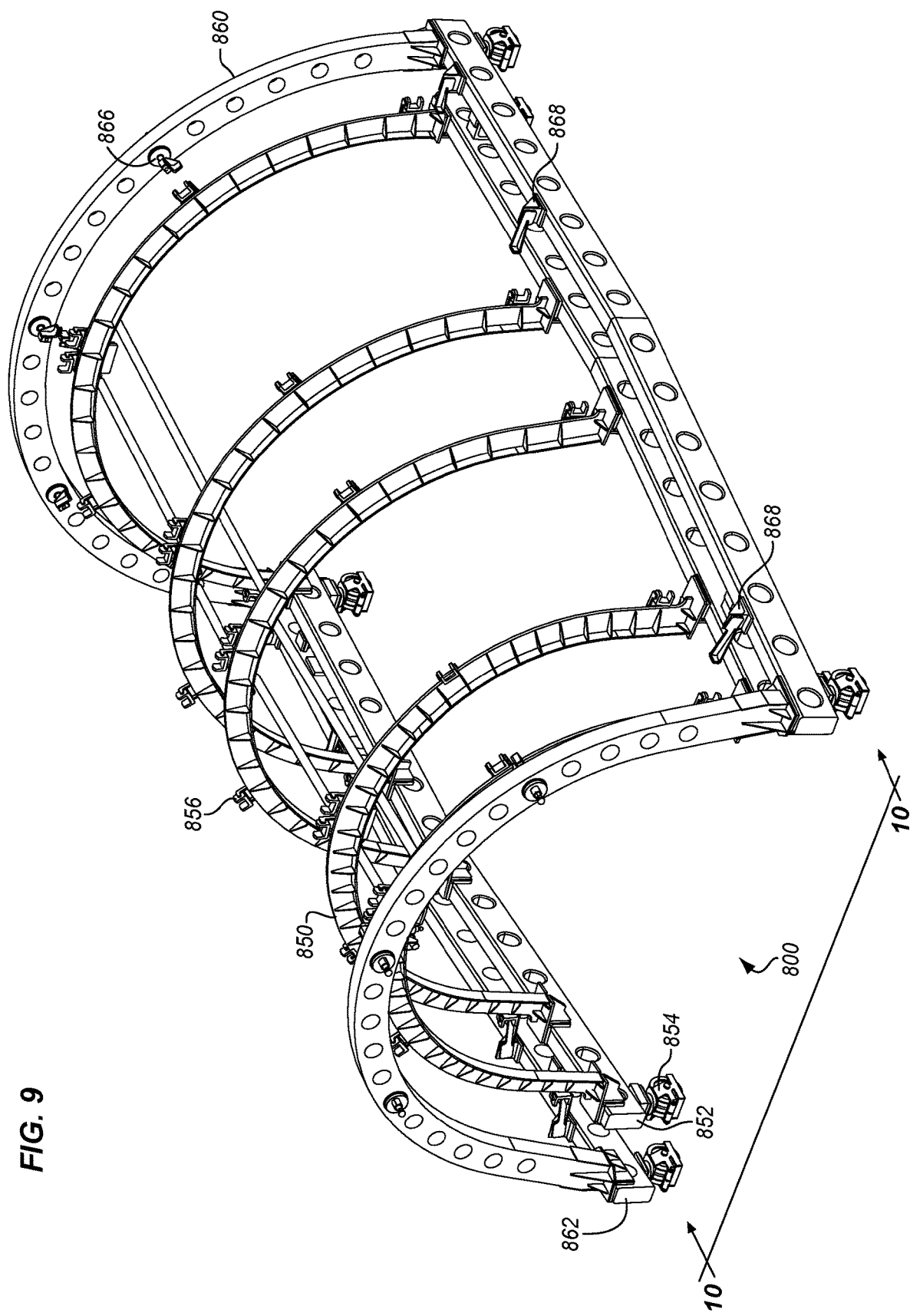
FIG. 9 is a perspective view of an Inner Mold Line (EVIL) conveyance and an Outer Mold Line (OML) conveyance for a composite part in an illustrative embodiment.

FIG. 9 is a perspective view of a tooling system 800 that includes an IML conveyance 850 and an Outer Mold Line (OML) conveyance 860 for a composite part 1000 in an illustrative embodiment. The composite part 1000 is created by cutting a hardened full barrel section longitudinally in half to form an upper half-barrel and/or a lower half-barrel section prior to or after demolding. The composite part 1000 is formed on either a full barrel section OML mandrel tool or a full barrel section IML mandrel tool. As a point of reference, mandrel 110 is a half-barrel section IML tool. The tooling system 800 operates as a handoff device that facilitates transfer of a composite part 1000 from either an IML or OML full barrel section mandrel.

The IML conveyance 850 fits within a concavity 1002 (FIG. 10) defined by the composite part 1000, and exhibits a half-circle cross-section. The IML conveyance 850 includes frame 852, rollers 854, and affixation elements 856 which contact the composite part. The affixation elements 856 enable a composite part 1000 to be affixed to the IML conveyance 850, such as via physically mating to the composite part 1000 and/or being bolted to the composite part, or etc. The rollers 854 are affixed to the IML conveyance 850, and facilitate transport of the IML conveyance 850 while the composite part is affixed to the IML conveyance 850.

The OML conveyance 860 surrounds an exterior surface 1004 defined by the composite part 1000, and exhibits a half-circle cross-section which complementarily surrounds the IML conveyance 850. OML conveyance 860 includes frame 862 and affixation elements 866. The affixation elements 866 enable a composite part to be affixed to the OML conveyance 860, such as via physically mating to the composite part 1000 and/or being bolted to the composite part, or etc. Couplers 868 unite the IML conveyance 850 to the OML conveyance 860 to sandwich composite part 1000 there between. In one embodiment, the affixation elements 856 at the IML conveyance 850 couple with different features at the composite part than the affixation elements 866 at the OML conveyance 860.

Figure 10A:
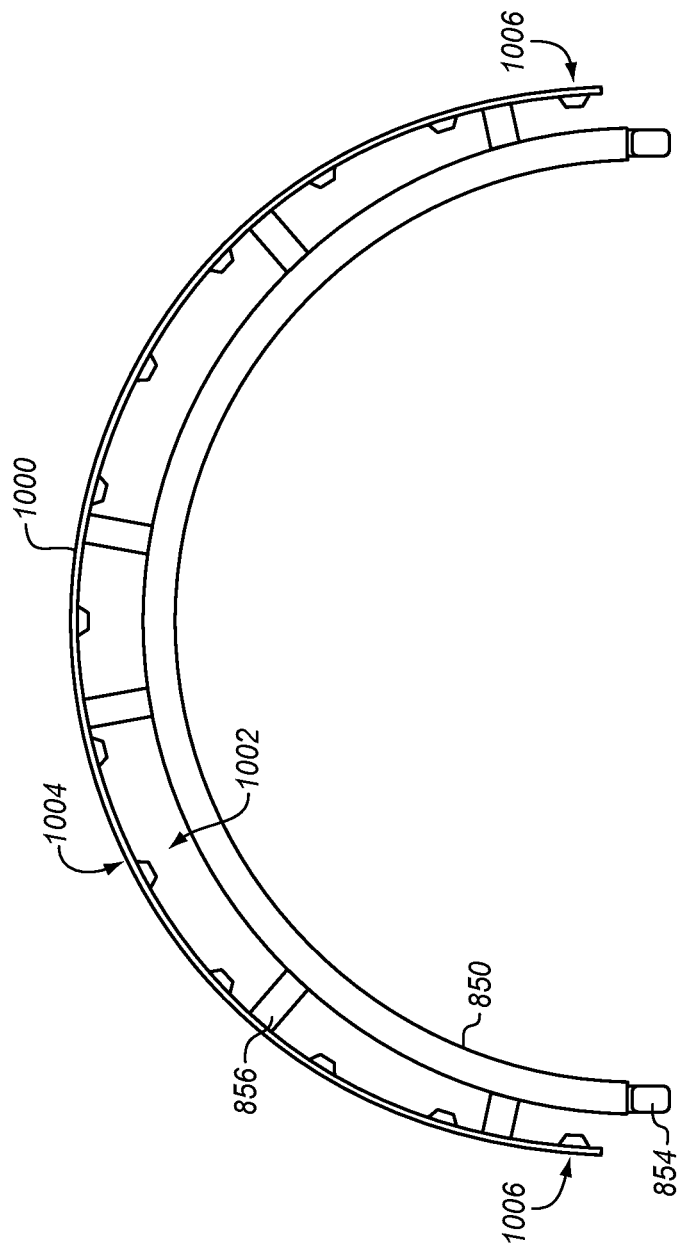
Figure 10B:
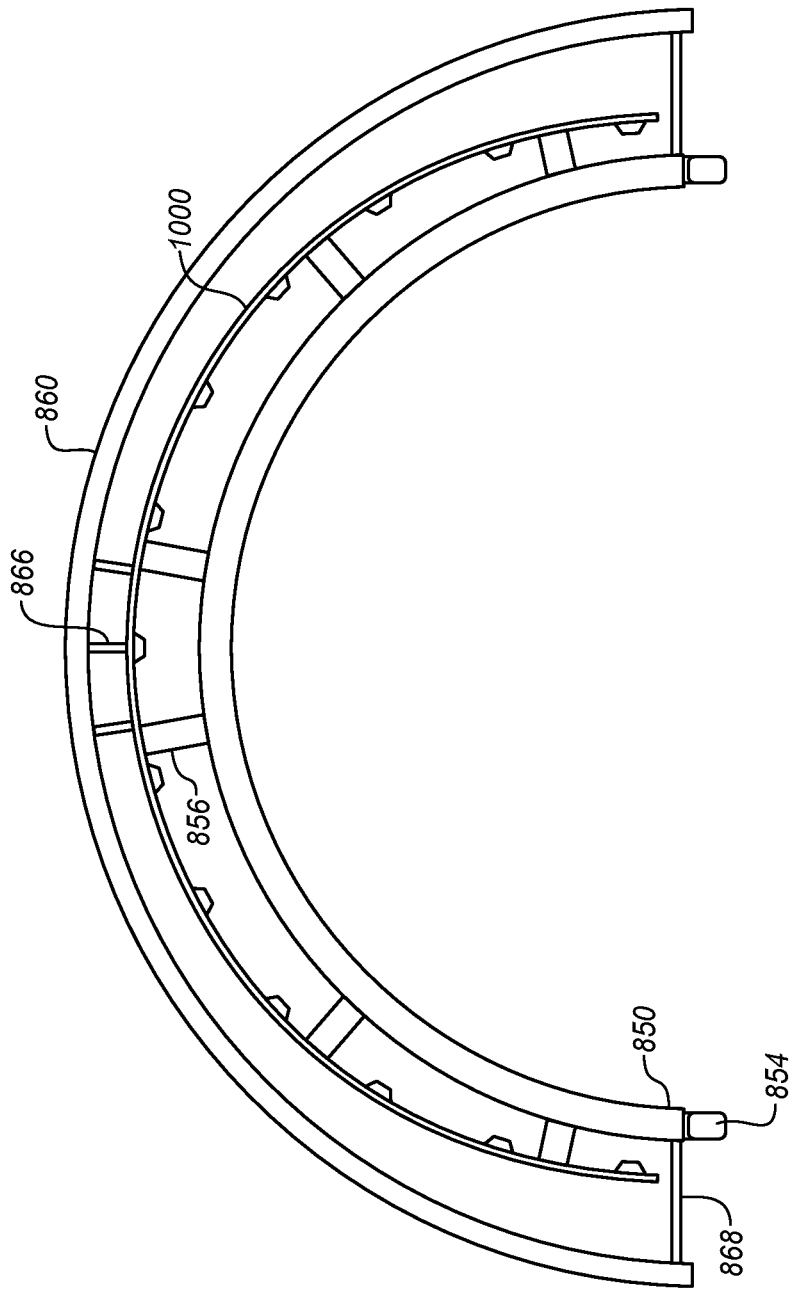
Figure 10D:
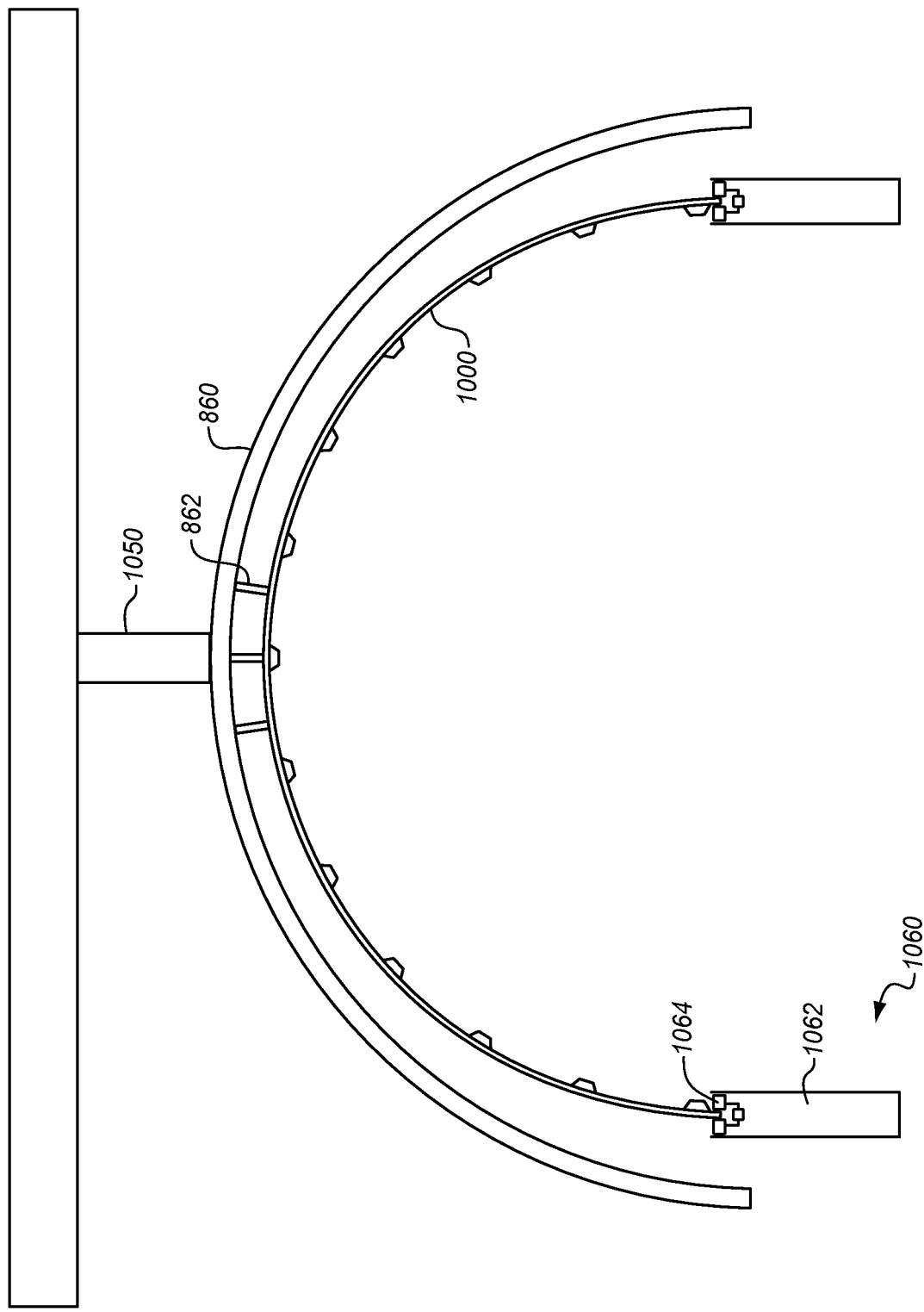

FIGS. 10A-10E depict transport of a composite part to a track 144 (FIG. 10D) via the conveyances of FIG. 9 in an illustrative embodiment. In FIG. 10A, a demolded composite part 1000 is secured to the IML conveyance 850 via affixation elements 856 that couple with complementary indexing features 1006 of the composite part 1000, of a quality and quantity similar to part indexing feature 122 for composite part 120. In FIG. 10B, the OML conveyance 860, and couplers 868 are installed to unite the OML conveyance 860 and the EVIL conveyance 850. The combined components are then transported beneath a crane 1050 or other tool for picking up the composite part 1000, OML conveyance 860 and IML conveyance 850 or transported upon rollers 854 or similar device. In FIG. 10C, the IML conveyance 850 is removed, and the crane 1050 picks up the OML conveyance 860, which is holding the composite part 1000. In FIG. 10D, the crane 1050 disposes the OML conveyance 860 and the composite part 1000 onto a track 144 comprising stanchions 1062 having rollers 1064, and then in FIG. 10E the OML conveyance 860 is removed. The composite part 1000 then proceeds along the track 144 in a process direction 199 into or out of the page.

Figure 11:
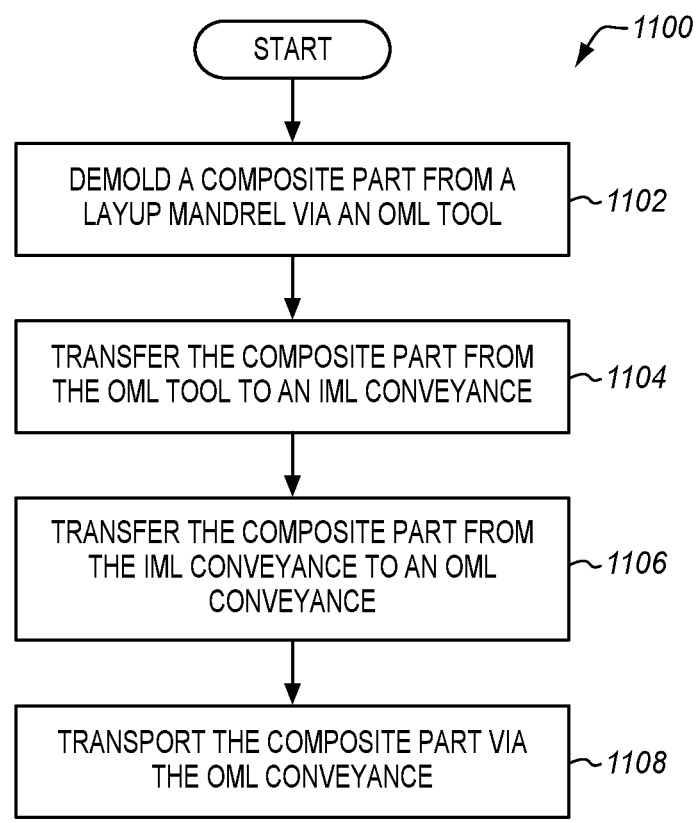
FIG. 11 is a flowchart illustrating a method for transferring a composite part to a conveyance for transport in an illustrative embodiment.

FIG. 11 is a flowchart illustrating a method 1100 for transferring a composite part 1000 to a conveyance in an illustrative embodiment, and may be operated via the tooling system 800 of FIG. 9-10. Step 1102 includes demolding a composite part 1000 from a mandrel 110 via an Outer Mold Line (OML) mandrel tool 130, such as extraction tool 130 of FIG. 1A, for example, via any of the methods of FIGS. 2A-2C. In one embodiment, the composite part 1000 is created by cutting a hardened full barrel section in half to form an upper half-barrel or a lower half-barrel section prior to or after demolding. Tooling system 800 is then brought in to transfer the demolded composite part 1000 to the assembly line 102 and track 144. Then, the composite part 1000 is placed onto track 144 and advanced through assembly line 102 in a manner similar to composite part 120.

Step 1104 includes transferring the composite part 1000 from the OML mandrel tool to IML conveyance 850. In one embodiment, transferring the composite part 1000 from the OML mandrel tool to the EVIL conveyance 850 comprises mating to indexing features 1006 in a manufacturing excess of the composite part 1000 including a manufacturing excess that will later be removed from the composite part 1000 prior to completion of assembly. The indexing features 1006 of composite part 1000 are indexed to the IML conveyance 850 prior to demold from the OML mandrel tool.

In one embodiment, this comprises coupling the composite part 1000 onto the IML conveyance 850, and then mating the affixation elements 856 to complementary indexing features 1006 at the composite part 1000. In a further embodiment, the composite part 1000 is vacuum coupled or attached via fasteners to the IML conveyance 850.

Step 1106 comprises transferring the composite part 1000 from the EVIL conveyance 850 to an OML conveyance 860 either before or after rolling the composite part 1000 to a desired track 144 placement location at assembly line 102 via the EVIL conveyance 850. In one embodiment, transferring the composite part 1000 from the IML conveyance 850 to the OML conveyance 860 comprises mating indexing features 1006 in a manufacturing excess of the composite part 1000 with complementary indexing features at the OML conveyance 860, and releasing the EVIL conveyance 850. The composite part 1000 would include manufacturing excess such as, for example, the manufacturing (127, 129) which is shown on the composite part 120 depicted in FIG. 1A. This manufacturing excess of composite part 1000 would be later removed from the composite part 1000. In a further embodiment, this comprises releasing the IML conveyance 850 form the composite part 1000 and affixing the OML conveyance 860 to the composite part 1000.

Step 1108 includes transporting the composite part via the OML conveyance 860. In one embodiment, this comprises operating a crane 1050 to lift the OML conveyance 860 over a track 144, and then lowering the OML conveyance 860 to place the composite part 1000 into contact with the track 144. The OML conveyance 860 is then removed and the composite part 1000 proceeds along the track 144.

Figure 12:
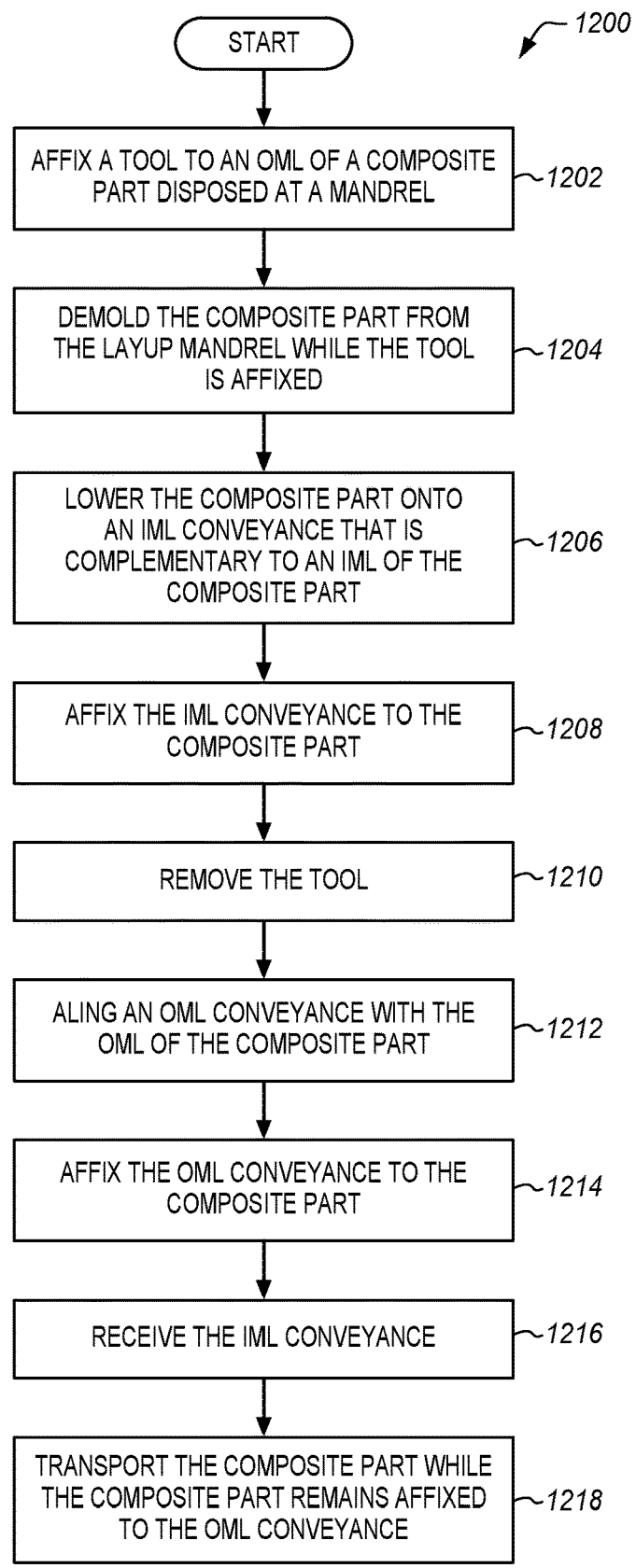
FIG. 12 is a further flowchart illustrating a method for transferring a composite part to a conveyance for transport in an illustrative embodiment.

FIG. 12 is a flowchart illustrating a method 1200 for transporting a composite part 1000 to a track 144 for transport in an illustrative embodiment. Step 1202 includes affixing a tool such as extraction tool 130 to composite part 120, 1000 disposed upon an EVIL mandrel. Step 1204 includes demolding the composite part 120, 1000 from the mandrel while the extraction tool 130 is affixed. Step 1206 includes lowering the composite part 120, 1000 onto an Inner Mold Line (IML) conveyance 850 that is complementary to an IML of the composite part 120, 1000. Step 1208 includes affixing the IML conveyance 850 to the composite part 120, 1000. Step 1210 includes removing the extraction tool 130. Step 1212 includes aligning an OML conveyance 860 with the Outer Mold Line (OML) of the composite part 120, 1000. Step 1214 includes affixing the OML conveyance 860 to the composite part 120, 1000. Step 1216 includes removing the IML conveyance 850. Step 1218 includes transporting the composite part 120, 1000 while the composite part 120, 1000 remains affixed to the OML conveyance 860.

Figure 13:
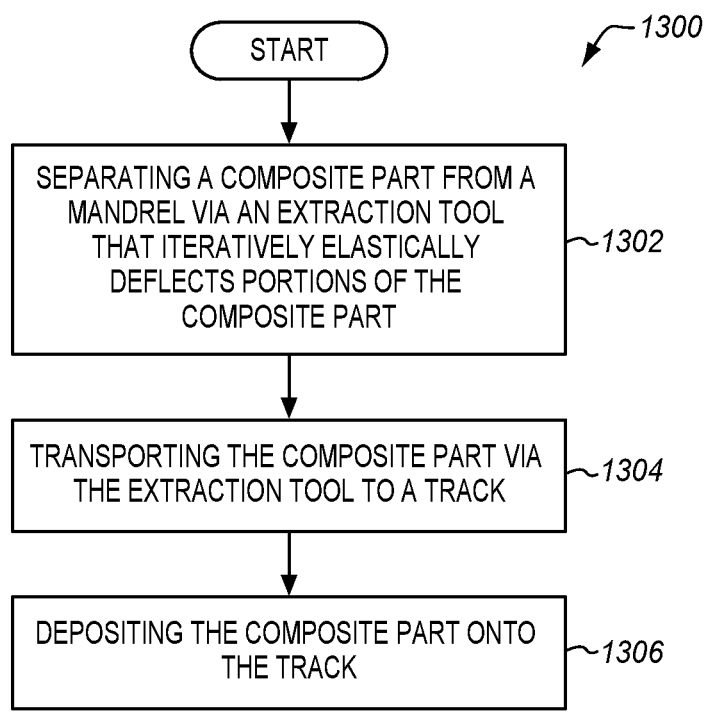
FIG. 13 is a further flowchart illustrating a method for demolding and transferring a composite part in an illustrative embodiment.

FIG. 13 is a further flowchart illustrating a method 1300 for demolding and transferring a composite part 120 in an illustrative embodiment. According to method 1300, step 1302 includes separating a composite part 120 from a mandrel 110 via an extraction tool 130 that iteratively elastically deflects first portion 141-1, second portion 141-2 and third portion 141-3 of the composite part 120. Step 1302 may be performed in any suitable manner, and in one embodiment occurs via method 200, 250, and/or 270 of FIGS. 2A-2C. Step 1304 includes transporting the composite part 120 via the extraction tool 130 to a track 144. This step may occur as shown and described with regard to FIGS. 3-6. Step 1306 includes depositing the composite part 120 onto the track 144. This step may occur as shown and described with regard to FIG. 7. In one embodiment, depositing the composite part 120 onto the track 144 comprises lowering the bearing edge 124 of the composite part 120 onto track 144. In a further embodiment, method 1300 further comprises retaining the composite part 120 in grooves at the track 144, and advancing the composite part 120 along the track 144 to work stations 160 that perform work on the composite part 120.

EXAMPLES

Figure 14:
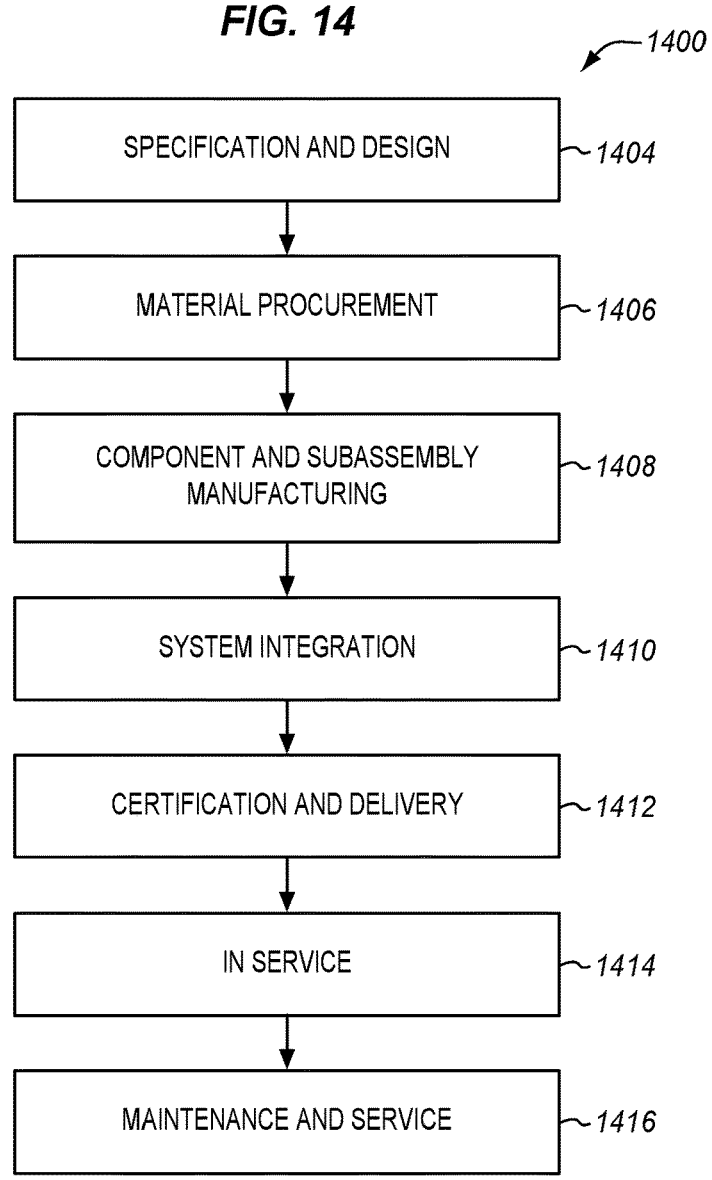
FIG. 14 is a flow diagram of aircraft production and service methodology in an illustrative embodiment.
Figure 15:
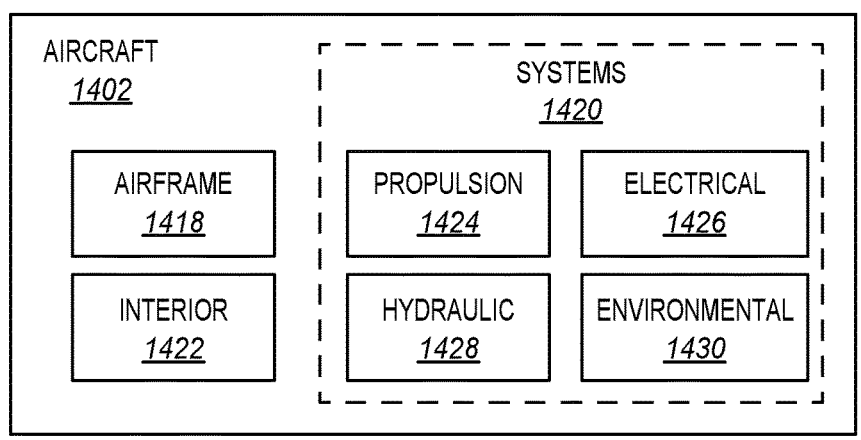
FIG. 15 is a block diagram of an aircraft in an illustrative embodiment.

Referring more particularly to the drawings, embodiments of the disclosure may be described in the context of aircraft manufacturing and service in method 1400 as shown in FIG. 14 and an aircraft 1402 as shown in FIG. 15. During pre-production, method 1400 may include specification and design 1404 of the aircraft 1402 and material procurement 1406. During production, component and subassembly manufacturing 1408 and system integration 1410 of the aircraft 1402 takes place. Thereafter, the aircraft 1402 may go through certification and delivery 1412 in order to be placed in service 1414. While in service by a customer, the aircraft 1402 is scheduled for routine work in maintenance and service 1416 (which may also include modification, reconfiguration, refurbishment, and so on). Apparatus and methods embodied herein may be employed during any one or more suitable stages of the production and service described in method 1400 (e.g., specification and design 1404, material procurement 1406, component and subassembly manufacturing 1408, system integration 1410, certification and delivery 1412, service 1414, maintenance and service 1416) and/or any suitable component of aircraft 1402 (e.g., airframe 1418, systems 1420, interior 1422, propulsion system 1424, electrical system 1426, hydraulic system 1428, environmental 1430).

Each of the processes of method 1400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 1402 produced by method 1400 may include an airframe 1418 with a plurality of systems 1420 and an interior 1422. Examples of systems 1420 include one or more of a propulsion system 1424, an electrical system 1426, a hydraulic system 1428, and an environmental system 1430. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1400. For example, components or subassemblies corresponding to component and subassembly manufacturing 1408 may be fabricated or manufactured in a manner similar to components or subassemblies produced while the aircraft 1402 is in service. Also, one or more apparatus embodiments, method embodiments, or a combination thereof may be utilized during the subassembly manufacturing 1408 and system integration 1410, for example, by substantially expediting assembly of or reducing the cost of an aircraft 1402. Similarly, one or more of apparatus embodiments, method embodiments, or a combination thereof may be utilized while the aircraft 1402 is in service, for example and without limitation during the maintenance and service 1416. Thus, the invention may be used in any stages discussed herein, or any combination thereof, such as specification and design 1404, material procurement 1406, component and subassembly manufacturing 1408, system integration 1410, certification and delivery 1412, service 1414, maintenance and service 1416) and/or any suitable component of aircraft 1402 (e.g., airframe 1418, systems 1420, interior 1422, propulsion system 1424, electrical system 1426, hydraulic system 1428, and/or environmental 1430.

In one embodiment, a part comprises a portion of airframe 1418, and is manufactured during component and subassembly manufacturing 1408. The part may then be assembled into an aircraft in system integration 1410, and then be utilized in service 1414 until wear renders the part unusable. Then, in maintenance and service 1416, the part may be discarded and replaced with a newly manufactured part. Inventive components and methods may be utilized throughout component and subassembly manufacturing 1408 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for demolding a composite part from a mandrel, the method comprising:
   mechanically coupling a first arm of an extraction tool to a first arcuate portion of a composite part that has been hardened onto a mandrel;
   mechanically coupling a second arm of an extraction tool to a second arcuate portion of the composite part; and
   separating the composite part from the mandrel by iteratively performing the following operations until the composite part no longer contacts the mandrel;
   elastically straining the first arcuate portion of the composite part via the first arm;
   elastically straining the second arcuate portion of the composite part via the second arm; and
   iteratively alternately increasing an elastic strain applied to the first arcuate portion and an elastic strain applied to the second arcuate portion.

2. The method of claim 1 further comprising:
   determining that the composite part no longer contacts the mandrel based on a reduction in resistance to translation of the composite part.

3. The method of claim 1 further comprising:
   placing a lip of the first arm into contact with an end of the first arcuate portion; and
   placing a lip of the second arm into contact with an end of the second arcuate portion.

4. The method of claim 1 wherein:
   mechanically coupling the first arm to the first arcuate portion comprises placing a vacuum coupler at the first arm into contact with the first arcuate portion; and
   mechanically coupling the second arm to the second arcuate portion comprises placing a vacuum coupler at the second arm into contact with the second arcuate portion.

5. The method of claim 1 wherein:
   mechanically coupling the first arm to the first arcuate portion comprises gripping an indexing feature in the first arcuate portion via the first arm; and mechanically coupling the second arm to the second arcuate portion comprises gripping an indexing feature in the second arcuate portion via the second arm.

6. The method of claim 1 wherein:
mechanically coupling the first arm to the first arcuate portion comprises placing the first arm into contact with a side of a half-barrel section of fuselage; and
mechanically coupling the second arm to the second arcuate portion comprises placing the first arm into contact with a side of the half-barrel section of fuselage.

7. The method of claim 1 further comprising:
releasing elastic strain on the composite part, causing the composite part to elastically return to a shape defined by the mandrel.

8. The method of claim 1 further comprising:
lifting the composite part off of the mandrel; and
placing the composite part onto a track for an assembly line.

9. A method for demolding a composite part, the method comprising:
elastically straining a first arcuate portion of a composite part away from a mandrel;
elastically straining a second arcuate portion of the composite part away from the mandrel; and
iteratively increasing the elastic strain applied to the first arcuate portion and the elastic strain applied to the second arcuate portion comprising iteratively alternately increasing an elastic strain applied to a first arcuate portion and an elastic strain applied to a second arcuate portion.

10. The method of claim 9 further comprising:
releasing elastic strain on the composite part, causing the composite part to elastically return to a shape defined by the mandrel.

11. A method for demolding a composite part, the method comprising:
mechanically coupling a first arm set of an extraction tool to a first arcuate portion of a composite part that has been hardened onto a mandrel;
mechanically coupling a second arm set of the extraction tool to a second arcuate portion of the composite part that has been hardened onto the mandrel; and
separating hardened resin at the composite part from the mandrel by applying strain to the composite part via the first arm set and the second arm set comprising iteratively alternately increasing an elastic strain applied to a first arcuate portion and an elastic strain applied to a second arcuate portion.

12. The method of claim 11 further comprising:
releasing elastic strain on the composite part, causing the composite part to elastically return to a shape defined by the mandrel.

13. A method for demolding a composite part, the method comprising:
demolding a composite part away from a mandrel via an Outer Mold Line (OML) mandrel tool;
transferring the composite part away from the OML mandrel tool to an Inner Mold Line (EVIL) conveyance;
transferring the composite part away from the IML conveyance to an OML conveyance; and
transporting the composite part via the OML conveyance,
wherein indexing features in a manufacturing excess of the composite part are mated to the EVIL conveyance, and
wherein the indexing features of composite part are indexed to the IML conveyance prior to demold from the OML mandrel tool.

14. The method of claim 13 further comprising:
releasing elastic strain on the composite part, causing the composite part to elastically return to a shape defined by the mandrel.

15. A method for demolding a composite part, the method comprising:
affixing a tool to an Outer Mold Line (OML) of a composite part disposed at a mandrel;
demolding the composite part from the mandrel while the tool is affixed;
lowering the composite part onto an IML conveyance that is complementary to an IML of the composite part;
affixing the IML conveyance to the composite part;
removing the tool;
aligning an OML conveyance with the OML of the composite part;
affixing the OML conveyance to the composite part;
receiving the IML conveyance; and
transporting the composite part while the composite part remains affixed to the IML conveyance,
wherein indexing features in a manufacturing excess of the composite part are mated to the EVIL conveyance, and
wherein the indexing features of composite part are indexed to the IML conveyance prior to demold from an OML mandrel tool.

16. The method of claim 15 further comprising:
releasing elastic strain on the composite part, causing the composite part to elastically return to a shape defined by the mandrel.

17. A method for separating a composite part from a mandrel, the method comprising:
separating a composite part from a mandrel via an extraction tool that iteratively elastically deflects portions of a composite part comprising iteratively alternately increasing an elastic strain applied to a first arcuate portion and an elastic strain applied to a second arcuate portion;
transporting the composite part via the extraction tool to a track; and
depositing the composite part onto the track.

18. The method of claim 17 further comprising:
releasing elastic strain on the composite part, causing the composite part to elastically return to a shape defined by the mandrel.

19. A method for demolding a composite part from a mandrel, the method comprising:
mechanically coupling a first arm of an extraction tool to a first arcuate portion of a composite part that has been hardened onto a mandrel by placing a vacuum coupler at the first arm into contact with the first arcuate portion or gripping an indexing feature in the first arcuate portion via the first arm;
mechanically coupling a second arm of an extraction tool to a second arcuate portion of the composite part by placing a vacuum coupler at the second arm into contact with the second arcuate portion or gripping an indexing feature in the second arcuate portion via the second arm;
separating the composite part from the mandrel by iteratively performing the following operations until the composite part no longer contacts the mandrel:
elastically straining the first arcuate portion of the composite part via the first arm; and elastically straining the second arcuate portion of the composite part via the second arm;

iteratively alternately increasing an elastic strain applied to the first arcuate portion and an elastic strain applied to the second arcuate portion;

determining that the composite part no longer contacts the mandrel based on a reduction in resistance to translation of the composite part;

releasing elastic strain on the composite part, causing the composite part to elastically return to a shape defined by the mandrel;

lifting the composite part off of the mandrel; and placing the composite part onto a track for an assembly line.

20. The method of claim 19 further comprising:

releasing elastic strain on the composite part, causing the composite part to elastically return to a shape defined by the mandrel.

21. A method for demolding a composite part, the method comprising:

elastically straining a first arcuate portion of a composite part away from a mandrel by gripping a bearing edge of the first arcuate portion;

elastically straining a second arcuate portion of the composite part away from the mandrel by gripping a bearing edge of the second arcuate portion;

iteratively alternately increasing the elastic strain applied to the first arcuate portion and the elastic strain applied to the second arcuate portion;

determining that resin at the composite part has released from the mandrel based on a reduction in resistance to translation of the composite part; and elastically straining a third portion of the composite part away from the mandrel.

22. The method of claim 21 further comprising:

releasing elastic strain on the composite part, causing the composite part to elastically return to a shape defined by the mandrel.

23. A method for demolding a composite part, the method comprising:

mechanically coupling a first arm set of an extraction tool to a first arcuate portion of a composite part that has been hardened onto a mandrel by applying vacuum coupling to the composite part via vacuum couplers at the first arm set;

mechanically coupling a second arm set of the extraction tool to a second arcuate portion of the composite part that has been hardened onto the mandrel by applying vacuum coupling to the composite part via vacuum couplers at the second arm set; and separating hardened resin at the composite part from the mandrel by applying strain to the composite part via the first arm set and the second arm set to separate hardened resin between a stringer of the composite part from a trough of mandrel comprising iteratively alternately increasing an elastic strain applied to a first arcuate portion and an elastic strain applied to a second arcuate portion.

24. The method of claim 23 further comprising:

releasing elastic strain on the composite part, causing the composite part to elastically return to a shape defined by the mandrel.

25. A method for demolding a composite part, the method comprising:

demolding a composite part away from a mandrel via an Outer Mold Line (OML) mandrel tool;

transferring the composite part away from the OML mandrel tool to an Inner Mold Line (EVIL) conveyance, wherein indexing features in a manufacturing excess of the composite part are mated to the IML conveyance, wherein the indexing features of composite part are indexed to the IML conveyance prior to demold from the OML mandrel tool, and wherein the composite part is vacuum coupled or attached via fasteners to the EVIL conveyance;

transferring the composite part away from the IML conveyance to an OML conveyance, wherein the indexing features of the composite part are mated with complementary indexing features at the OML conveyance; and transporting the composite part via the OML conveyance, wherein a crane lifts the OML conveyance over a track and lowers the OML conveyance to place the composite part into contact with the track, and wherein the OML conveyance is removed and the composite part proceeds along the track.

26. The method of claim 25 further comprising:

releasing elastic strain on the composite part, causing the composite part to elastically return to a shape defined by the mandrel.

* * * * *